United States Patent
Shimomura

(10) Patent No.: US 10,588,122 B2
(45) Date of Patent: Mar. 10, 2020

(54) WIRELESS BASE STATION, WIRELESS TERMINAL, AND WIRELESS COMMUNICATION SYSTEM FOR LICENSE ASSISTED ACCESS

(71) Applicant: FUJITSU LIMITED, Kawasaki-shi, Kanagawa (JP)

(72) Inventor: Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 24 days.

(21) Appl. No.: 15/708,731

(22) Filed: Sep. 19, 2017

(65) Prior Publication Data

US 2018/0007674 A1    Jan. 4, 2018

Related U.S. Application Data

(63) Continuation of application No. PCT/JP2015/061036, filed on Apr. 8, 2015.

(51) Int. Cl.
| | |
|---|---|
| *H04W 72/04* | (2009.01) |
| *H04W 56/00* | (2009.01) |
| *H04W 16/14* | (2009.01) |
| *H04W 88/02* | (2009.01) |
| *H04W 88/08* | (2009.01) |

(52) U.S. Cl.
CPC ......... *H04W 72/044* (2013.01); *H04W 16/14* (2013.01); *H04W 56/00* (2013.01); *H04W 88/02* (2013.01); *H04W 88/08* (2013.01)

(58) Field of Classification Search
CPC .............................. H04W 88/02; H04W 88/08
See application file for complete search history.

(56) References Cited

U.S. PATENT DOCUMENTS

| | | |
|---|---|---|
| 2011/0317614 A1 | 12/2011 | Park et al. |
| 2014/0161034 A1 | 6/2014 | Han et al. |

(Continued)

FOREIGN PATENT DOCUMENTS

| | | |
|---|---|---|
| KR | 10-2010-0091926 A | 8/2010 |
| WO | 2014027495 A1 | 2/2014 |

OTHER PUBLICATIONS

European search report with the supplementary European search report and the European search opinion for corresponding European Patent Application No. 15888481.7-1215, dated Mar. 5, 2018.

(Continued)

*Primary Examiner* — Kent Krueger
(74) *Attorney, Agent, or Firm* — Myers Wolin, LLC

(57) ABSTRACT

A base station performs wireless communication with a terminal using a first frequency band which needs a license to use for wireless communication and a second frequency band which does not need the license to use for the wireless communication. The base station includes: a generator that generates a request signal for requesting data transmission of the terminal in the second frequency band and specifying a first transmission timing of the terminal; and a transmitter that transmits the request signal to the terminal, wherein the request signal includes information specifying a second transmission timing, which is a next transmission timing when the terminal does not perform data transmission at the first transmission timing and is specified by an offset from a reference timing.

15 Claims, 15 Drawing Sheets

(56) References Cited

U.S. PATENT DOCUMENTS

| | | | |
|---|---|---|---|
| 2014/0286265 A1 | 9/2014 | Park et al. | |
| 2015/0215962 A1 | 7/2015 | Mizusawa | |
| 2017/0353912 A1* | 12/2017 | Einhaus | H04W 56/00 |
| 2018/0020375 A1* | 1/2018 | Matsumoto | H04W 28/06 |

OTHER PUBLICATIONS

Fujitsu—3GPP TSG RAN WG1, Meeting #80, Athens, Greece, Feb. 9-13, 2015; R1-150186; "Design of LAA UL transmission"; Document for Discussion/Decision. [cited in ISR for PCT/JP2015/061036].

Intel Corporation—3GPP TSG RAN WG1, Meeting #80, Athens, Greece, Feb. 9-13, 2015, R1-150507; "On the LAA uplink: scheduling, LBT, and HARQ", Document for Discussion and Decision. [cited in ISR for PCT/JP2015/061036].

Coolpad—3GPP TSG RAN WG1, Meeting #80, Athens, Greece, Feb. 9-13, 2015; R1-150511; "Consideration on the UL scheduling design for LAA"; Document for Discussion and Decision. [cited in ISR for PCT/JP2015/061036].

Samsung—3GPP TSG RAN WG1, Meeting #80, Athens, Greece, Feb. 9-13, 2015; R1-150368; "Discussion on UL transmission for LAA"; Document for Discussion. [cited in ISR for PCT/JP2015/061036].

Kyocera—3GPP TSG RAN WG1, Meeting #80bis, Belgrade, Serbia, Apr. 20-24, 2015; R1-151464; "LAA UL Design"; Document for Discussion/Decision. [cited in ISR for PCT/JP2015/061036].

Institute for Information Industry (III)—3GPP TSG RAN WG1, Meeting #80bis, Belgrade, Serbia, Apr. 20-24, 2015; R1-151973; "On the Design of LAA Uplink Transmission"; Document for Discussion and decision. [cited in ISR for PCT/JP2015/061036].

International Search Report with Written Opinion for corresponding International Patent Application No. PCT/JP2015/061036, dated Jun. 16, 2015, with English translation attached.

Notice of Preliminary Rejection issued by the Korean Intellectual Property Office for corresponding Korean Patent Application No. 10-2017-7027479, dated Dec. 18, 2018, with an English translation.

* cited by examiner

WIRELESS BASE STATION, WIRELESS TERMINAL, AND WIRELESS COMMUNICATION SYSTEM FOR LICENSE ASSISTED ACCESS

CROSS-REFERENCE TO RELATED APPLICATION

This application is a continuation of International Application No. PCT/JP2015/061036, filed on Apr. 8, 2015 and designating the U.S., the entire contents of which are incorporated herein by reference.

FIELD

The present invention relates to a base station, a terminal, a wireless communication system, a control method of the base station, and a control method of the terminal.

BACKGROUND

In recent years, in a wireless communication system such as a mobile phone system, discussion is being conducted on the next generation wireless communication technology in order to further increase the speed and increase the capacity, etc. of wireless communication. For example, in a communication standard called LTE (Long Term Evolution), a technique of performing communication using a carrier wave in a frequency band that requires a license (LC: Licensed band Carrier) and a carrier wave in a frequency band that does not require a license (UC: Unlicensed band Carrier) is being studied. The technique is called LAA (Licensed Assisted Access).

In LAA, when a terminal performs UL (Up Link) transmission to a base station in the unlicensed band, the base station transmits a UL grant for requiring data transmission to the terminal via a licensed band. The base station then executes LBT (Listen Before Talk) in the unlicensed band, for example, before the terminal performs transmission in UL. When the unlicensed band is detected idle, the base station examines whether to transmit a reservation signal to the unlicensed band until a transmission timing of the terminal, for example, in order that the terminal ensures the unlicensed band used for UL data transmission. Thus, the terminal can perform UL data transmission using the unlicensed band after a predetermined period of time from the UL grant.

Non Patent Literature 1: 3GPP RAN1 Contribution R1-50186

Incidentally, in the technique of the non patent literature, when a busy state of the unlicensed band continues and the terminal does not receive the reservation signal in the unlicensed band by the time of timing of the UL data transmission, the terminal cancels, for example, the UL data transmission. As a result, the transmission opportunity of data scheduled to be transmitted by the terminal is postponed until a predetermined period of time passes since the next UL grant transmitted from the terminal. Therefore, the throughput of data transmission in UL from the terminal to the base station may decrease.

SUMMARY

According to an aspect of an embodiment of the invention, a base station performs wireless communication with a terminal using a first frequency band which needs a license to use for wireless communication and a second frequency band which does not need the license to use for the wireless communication. The base station includes: a generator that generates a request signal for requesting data transmission of the terminal in the second frequency band and specifying a first transmission timing of the terminal; and a transmitter that transmits the request signal to the terminal, wherein the request signal includes information specifying a second transmission timing, which is a next transmission timing when the terminal does not perform data transmission at the first transmission timing and is specified by an offset from a reference timing.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Exemplary embodiments of the base station, the terminal, the wireless communication system, the control method of the base station, and the control method of the terminal disclosed in the present application will be explained in detail below with reference to the accompanying drawings.

It is to be noted that the embodiments below are not intended to limit the disclosed technology. Moreover, the embodiments can be combined appropriately without inconsistencies in processing contents.

[a] First Embodiment

Wireless Communication System 10

Figure 1:
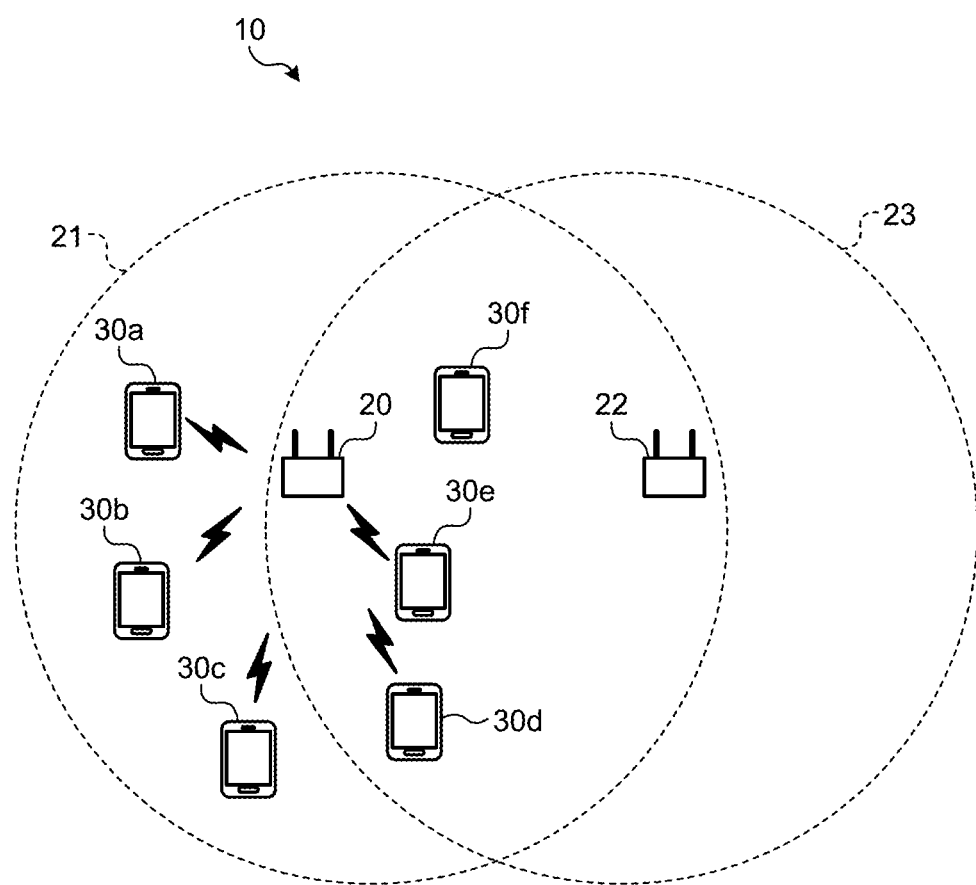
FIG. 1 is a diagram illustrating an example of a wireless communication system.

FIG. 1 is a diagram illustrating an example of a wireless communication system 10. The wireless communication system 10 includes a base station 20, a base station 22, and terminals 30a to 30f. Hereinafter, when the terminals 30a to 30f are generically referred to without discrimination, they are referred to as terminal 30. The base station 20 performs wireless communication based on, for example, LTE. The base station 20 is, for example, eNB (evolved Node B) in the LTE. The terminal 30 is, for example, UE (User Equipment) in the LTE. The terminal 30 belongs to a cell managed by the base station 20, and performs communication with the base station 20 in the cell. In the following explanation, the base station 20 and the terminal 30 may be described as an LTE system.

The base station 22 is, for example, a base station that belongs to a system different from the LTE system to which the base station 20 belongs. The base station 22 is, for example, a base station that belongs to an LTE system of a business operator different from the LTE system to which the base station 20 belongs, or a base station that belongs to other communication system such as a wireless LAN system.

The base station 20 performs wireless communication with the terminal 30 in the cell by using a first band dedicated to the LTE system to which the base station 20 belongs and a second band shared between the LTE system to which the base station 20 belongs and the other communication system. The first band is, for example, an LC in 2 GHz band. The second band is, for example, a UC in 5 GHz band. Hereinafter, the first band is called a licensed band, and the second band is called an unlicensed band.

In the LTE system to which the base station 20 belongs, the first band is allocated to, for example, PCC (Primary Component Carrier), and the second band is allocated to, for example, SCC (Secondary Component Carrier). In the present embodiment, the first band is a band dedicated to the LTE system to which the base station 20 belongs, and the second band is a shared band shared between the LTE system to which the base station 20 belongs and other communication system to which the base station 22 belongs.

Reference sign 21 in FIG. 1 indicates a range in which a radio wave transmitted from an arbitrary device reaches the base station 20 at an intensity determined to be busy by a carrier sense of the base station 20. Reference sign 23 indicates a range in which a radio wave transmitted from an arbitrary device reaches the base station 22 at an intensity determined to be busy by a carrier sense of the base station 22.

When UL data transmission using the unlicensed band is to be requested to the terminal 30, the base station 20 transmits the UL grant including resource information used for the UL data transmission to the terminal 30 in the licensed band. The UL grant is an example of a request signal for requesting the terminal 30 to transmit data to the base station 20. The base station 20 then executes LBT in the unlicensed band at a timing earlier than the timing of UL data transmission by the terminal 30. When the unlicensed band is detected idle, the base station 20 transmits a permission signal to the unlicensed band. In the present embodiment, the permission signal is, for example, a CTS (Clear to Send) signal. When detecting the permission signal in the unlicensed band, the terminal 30 having received the UL grant performs UL data transmission using the resource of the unlicensed band specified by the UL grant.

Operation of Wireless Communication System 10

Figure 2:
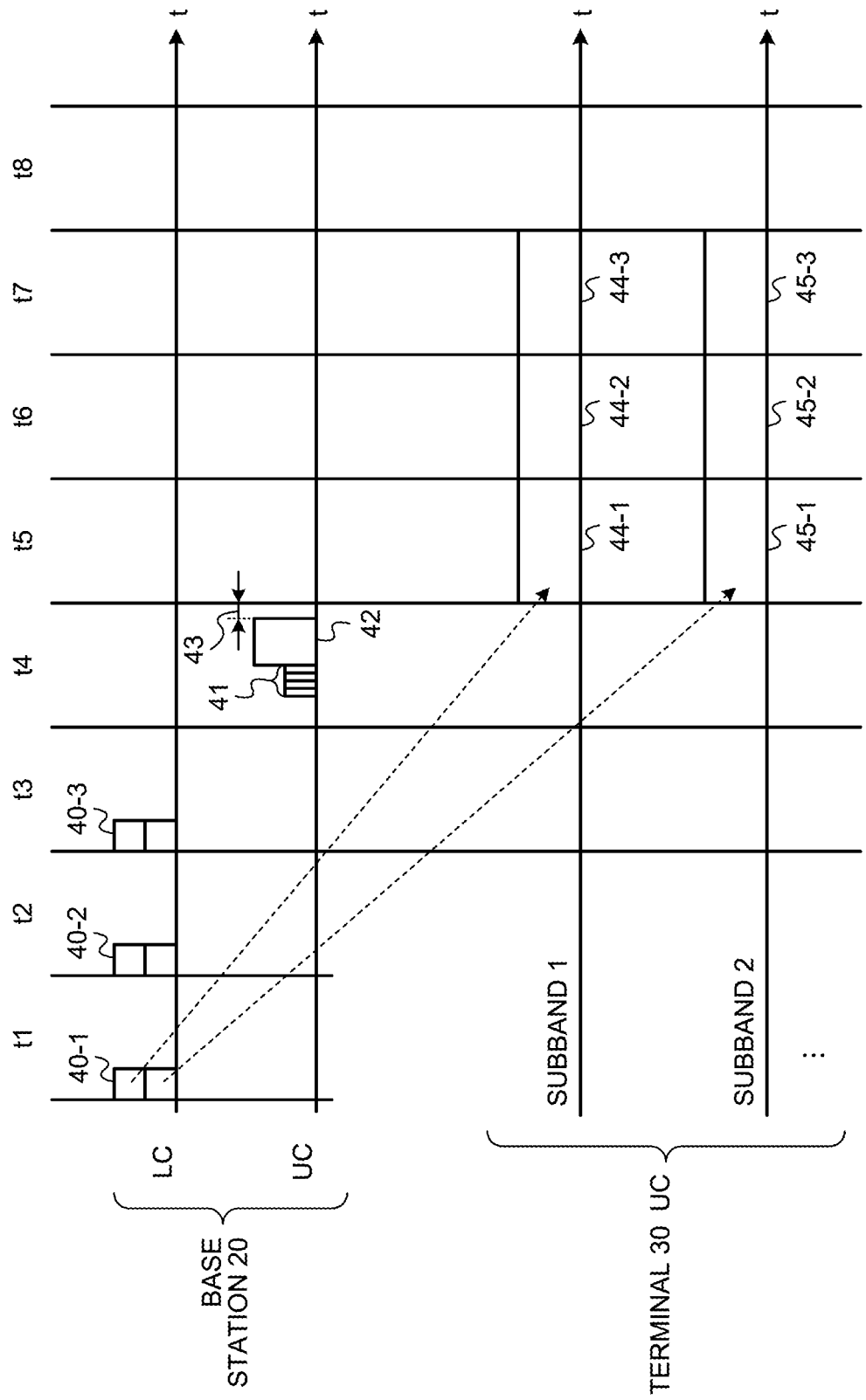
FIG. 2 is a diagram illustrating an example of an operation of a wireless communication system according to a first embodiment.
Figure 3:
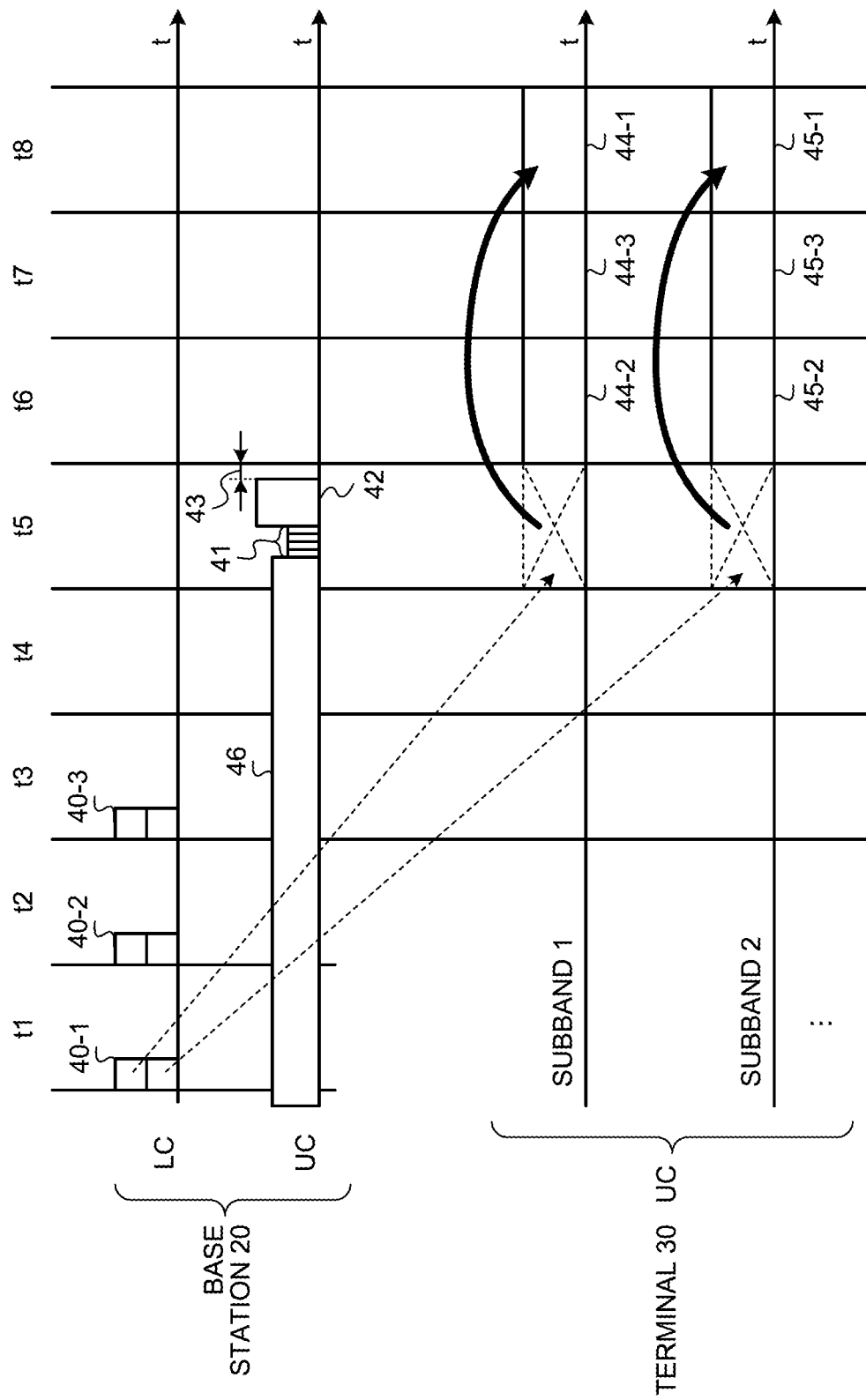
FIG. 3 is a diagram illustrating an example of the operation of the wireless communication system according to the first embodiment.

An example of the operation when the terminal 30 performs data transmission to the base station 20 in the unlicensed band according to an instruction from the base station 20 will be explained next with reference to FIG. 2 and FIG. 3. FIG. 2 and FIG. 3 are diagrams illustrating an example of the operation of the wireless communication system 10 according to the first embodiment. FIG. 2 represents a case where the unlicensed band is detected idle upon execution of LBT by the base station 20, and FIG. 3 represents a case where the unlicensed band is detected busy upon execution of LBT by the base station 20.

As illustrated in FIG. 2 and FIG. 3, the upper part represents the operation of the base station 20, and the lower part represents the operations of the terminals 30a to 30f. The horizontal axis in FIG. 2 and FIG. 3 indicates the flow of time, and each of t1 to t8 indicates, for example, a period (for example, 1 millisecond) of each subframe in LTE. The unlicensed band (UC) is divided into a plurality of subbands, for example, as illustrated in the lower parts of FIG. 2 and FIG. 3. In the present embodiment, the unlicensed band is, for example, 20 MHz, and is divided into, for example, four subbands for each 5 MHz.

For example, as illustrated in FIG. 2, when a data transmission request to the terminal 30a and the terminal 30b occurs, the base station 20 creates a UL grant 40-1 for requesting data transmission in UL. The base station 20 then transmits the created UL grant 40-1 to the terminal 30a and the terminal 30b in the licensed band (LC). Likewise, when a data transmission request to the terminal 30c and the terminal 30d occurs, the base station 20 transmits a UL grant 40-2 to the terminal 30c and the terminal 30d in the licensed band. Similarly, when a data transmission request to the terminal 30e and the terminal 30f occurs, the base station 20 transmits a UL grant 40-3 to the terminal 30e and the terminal 30f in the licensed band.

In the example illustrated in FIG. 2, the base station 20 transmits, for example, the UL grant 40-1 in a subframe period t1, transmits the UL grant 40-2 in a subframe period t2, and transmits the UL grant 40-3 in a subframe period t3. When receiving the permission signal in the unlicensed band by the time of a first transmission timing after a predetermined time since the reception of the UL grant 40, the terminal 30 transmits data to the base station 20 in the unlicensed band at the first timing. In the present embodiment, the first transmission timing is a timing after, for example, four subframes from the subframe in which the terminal 30 receives the UL grant 40.

In the present embodiment, each of UL grants 40 includes subband information, offset, and time limit information. The subband information included in the UL grant 40 indicates a subband of the unlicensed band used when the terminal 30 having received the UL grant 40 performs UL data transmission. The offset is information for specifying a second transmission timing at which the terminal 30 performs next data transmission when the terminal 30 does not receive the permission signal by the time of the first transmission timing after the reception of the UL grant 40 and receives the permission signal after the first transmission timing. In the offset, the second transmission timing is specified, for example, as a relative time from the first transmission timing. In the present embodiment, the second transmission timing is specified, for example, in units of subframes.

The time limit information included in the UL grant 40 indicates a time limit for the terminal 30 having received the UL grant 40 to wait for a permission signal. In the present embodiment, the time limit information is specified in units of subframes based on, for example, the subframe in which the UL grant 40 is transmitted. In the present embodiment, the time limit specified by the time limit information is, for example, a timing after 10 subframes from the subframe in which the UL grant 40 is transmitted. The time limit information may be specified by the number of times that the trial of UL retransmission is permitted.

In the present embodiment, the base station 20 allocates the period of data transmission in UL to each of the terminals 30 in units of subframes. When allocating the same subband to the UL data transmission performed by a plurality of terminals 30, the base station 20 performs scheduling so that data is transmitted from each of the terminals 30 in continuous subframes. However, the unlicensed band is also used in a communication system different from the LTE system to which the base station 20 belongs. Therefore, there are cases where the period that can be continuously occupied for data transmission is limited. In this case, the base station 20 performs scheduling so that data is transmitted from each of the terminals 30 in continuous subframes within the limits.

The base station 20 then transmits the UL grant 40, in the respective continuous subframes, to each of the terminals 30 that perform data transmission using the same subband. In the example of FIG. 2, for example, the base station 20 allocates same subband 1 to the UL data transmission performed by the terminals 30*a*, 30*c*, and 30*e*, and allocates same subband 2 to the UL data transmission performed by the terminals 30*b*, 30*d*, and 30*f*. The base station 20 then transmits the UL grants 40-1 to 40-3 in continuous subframe periods t1 to t3, respectively.

After the UL grant 40 is transmitted, the base station 20 executes LBT in the unlicensed band after a predetermined time (for example, after three subframes) has passed since the transmission of the UL grant 40. In the LBT, when it is confirmed that an idle state of the unlicensed band continues for a predetermined back-off period 41, the base station 20 transmits a permission signal 42 to all the subbands in the unlicensed band. For example, the permission signal 42 is transmitted to the unlicensed band with a length so that an end timing of a period 43 of SIFS (Short Inter Frame Space) after transmission of the permission signal 42 is ended is a timing of the boundary between the subframe in which the permission signal 42 is transmitted and the next subframe.

When receiving the UL grant 40, the terminal 30 acquires subband information, offset, and time limit information of the unlicensed band used for UL data transmission from the UL grant 40. Then, when receiving the permission signal 42 in the unlicensed band for a period before the first transmission timing after the reception of the UL grant 40, the terminal 30 transmits data in the subband specified by the UL grant 40 at the first transmission timing.

In the example illustrated in FIG. 2, the terminals 30*a* and 30*b* receive the permission signal 42 in a subframe period t4 for a period before a subframe period t5 which is the first transmission timing after the predetermined period since the reception of the UL grant 40-1. Then, the terminal 30*a* transmits UL data 44-1 in the subframe period t5, and the terminal 30*b* transmits UL data 45-1 in the subframe period t5. Likewise, the terminals 30*c* and 30*d* receive the permission signal 42 for a period before a subframe period t6 after the predetermined period since the reception of the UL grant 40-2. Then, the terminal 30*c* transmits UL data 44-2 in the subframe period t6, and the terminal 30*d* transmits UL data 45-2 in the subframe period t6. Similarly, the terminals 30*e* and 30*f* receive the permission signal 42 for a period before a subframe period t7 after the predetermined period since the reception of the UL grant 40-3. Then, the terminal 30*e* transmits UL data 44-3 in the subframe period t7, and the terminal 30*f* transmits UL data 45-3 in the subframe period t7.

On the other hand, for example, as illustrated in FIG. 3, when other signal 46 is transmitted to the unlicensed band in the subframe period t4 after a predetermined time from the transmission of the UL grant 40, the base station 20 detects that the unlicensed band is busy by the LBT. The base station 20 then continues the LBT in the unlicensed band. For example, as illustrated in FIG. 3, when the unlicensed band is detected idle in the subframe period t5, the base station 20 transmits the permission signal 42 to the unlicensed band after confirming continuation of the idle state for the predetermined back-off period 41.

In the example of FIG. 3, the terminals 30*a* and 30*b* do not receive the permission signal 42 for a period before the subframe period t5 including the first transmission timing after the predetermined period since the reception of the UL grant 40-1. Then, the terminals 30*a* and 30*b* receive the permission signal 42 in the subframe period t5 including the first transmission timing after the predetermined period since the reception of the UL grant 40-1.

Therefore, the terminal 30 transmits data to the base station 20 at the second timing at which the time specified by the offset acquired from the UL grant 40-1 passes based on the first transmission timing after the predetermined period since the reception of the UL grant 40-1. In the example of FIG. 3, each of the UL grants 40 includes offset for specifying a period of three subframes. Therefore, the terminals 30*a* and 30*b* specify a subframe period t8, as the second transmission timing, after the period of the three subframes from the subframe period t5 based on the subframe period t5 after the predetermined period since the reception of the UL grant 40-1. Then, the terminal 30*a* transmits the UL data 44-1 in the subframe period t8, and the terminal 30*b* transmits the UL data 45-1 in the subframe period t8.

Here, in the present embodiment, the value of the offset is set to the same value as the number of subframes continuously allocated as UL data transmission timing in the same subband. In the example of FIG. 3, the number of subframes continuously allocated as the UL data transmission timing in the same subband is 3. Therefore, in the example of FIG. 3, the value of the offset is set to, for example, 3. In the example of FIG. 3, although the subframe continuously allocated as the UL data transmission timing in the same subband is allocated to each separate terminal 30, the continuous subframes may be allocated to one terminal 30.

In the example of FIG. 3, the terminals 30*c* to 30*f* receive the permission signal 42 for a period before the subframe period after the predetermined period since the reception of the UL grant 40. Therefore, the terminals 30*c* to 30*f* do not postpone the transmission timing and transmit the UL data 44 and 45 in the subframe period after the predetermined period since the reception of the UL grant 40.

In this way, when not receiving the permission signal 42 by the time of the first transmission timing after the reception of the UL grant 40, each terminal 30 transmits data at the second transmission timing in which the period specified by the offset in the UL grant 40 has passed from the first transmission timing. As a result, when the terminal 30 does not receive the permission signal 42 by the time of the first transmission timing after the predetermined time since the reception of the UL grant 40, the terminal 30 can perform UL data transmission even if the transmission opportunity of the terminal 30 is not specified again by retransmission of the UL grant 40. Therefore, the terminal 30 can obtain the opportunity of UL data transmission earlier than the timing after the predetermined time from the retransmission of the UL grant 40. This makes it possible to improve the throughput in UL.

In the present embodiment, the value of the offset is set to the same value as the number of subframes continuously allocated as UL data transmission timing in the same subband. As a result, it is possible to avoid the data transmission timing from overlapping with the transmission timing of other terminal 30 even if data transmission is performed at the second transmission timing after the elapse of the period specified by the offset since the first transmission timing after the reception of the UL grant 40. Therefore, the base station 20 can more reliably receive the data transmitted from the terminal 30.

Moreover, in the present embodiment, the value of the offset is set to the same value as the number of subframes continuously allocated as UL data transmission timing in the same subband. As a result, the timing of data transmission of the terminal 30 that does not receive the permission signal by the time of the first transmission timing after the reception of the UL grant 40 is the timing of the next subframe of the continuously allocated subframes. As a result, when the timing of data transmission is postponed, respective data transmission timings are allocated to the continuous subframes. Accordingly, it is possible to prevent the start of data transmission by other communication device before the start of transmission of the postponed data in the unlicensed band.

Base Station 20

Figure 4:
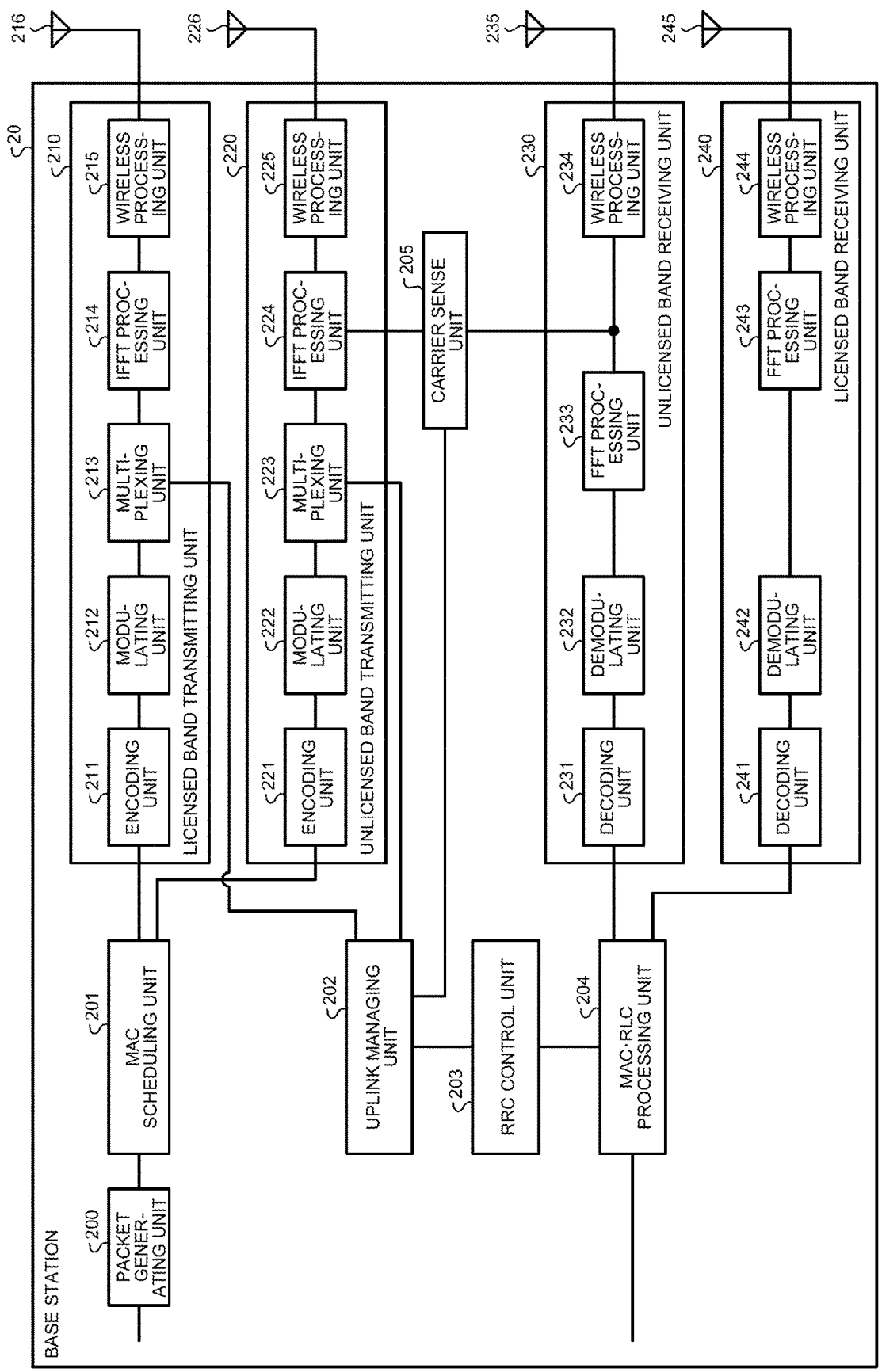
FIG. 4 is a block diagram illustrating an example of a base station according to the first embodiment.

FIG. 4 is a block diagram illustrating an example of the base station 20 according to the first embodiment. The base station 20 includes a packet generating unit 200, a MAC (Media Access Control) scheduling unit 201, an uplink managing unit 202, and an RRC (Radio Resource Control) control unit 203. The base station 20 also includes a MAC•RLC (Radio Link Control) processing unit 204 and a carrier sense unit 205. Furthermore, the base station 20 includes a licensed band transmitting unit 210, an unlicensed band transmitting unit 220, an unlicensed band receiving unit 230, a licensed band receiving unit 240, an antenna 216, an antenna 226, an antenna 235, and an antenna 245. In the present embodiment, although the antenna 216, the antenna 226, the antenna 235, and the antenna 245 are implemented by separate antennas, these antennas may be implemented by a single antenna as other example.

The licensed band receiving unit 240 performs processing of decoding data from the signal received in the licensed band. The licensed band receiving unit 240 includes a decoding unit 241, a demodulating unit 242, an FFT processing unit 243, and a wireless processing unit 244.

The wireless processing unit 244 performs wireless processing on the signal received via the antenna 245. The wireless processing performed by the wireless processing unit 244 includes, for example, processing of converting the frequency of the reception signal from the frequency of the licensed band to the frequency of baseband. The wireless processing unit 244 outputs the reception signal subjected to the wireless processing to the FFT processing unit 243.

The FFT processing unit 243 performs FFT (Fast Fourier Transform) processing on the reception signal output from the wireless processing unit 244. As a result, the reception signal whose frequency is converted from the licensed band to the baseband is converted from a time domain to a frequency domain. The FFT processing unit 243 outputs the reception signal subjected to the FFT processing to the demodulating unit 242.

The demodulating unit 242 demodulates the reception signal output from the FFT processing unit 243. The demodulating unit 242 then outputs the demodulated reception signal to the decoding unit 241. The decoding unit 241 decodes the reception signal output from the demodulating unit 242. The decoding unit 241 then outputs the decoded data to the MAC•RLC processing unit 204.

The unlicensed band receiving unit 230 performs processing of decoding data from the signal received in the unlicensed band. The unlicensed band receiving unit 230 includes a decoding unit 231, a demodulating unit 232, an FFT processing unit 233, and a wireless processing unit 234.

The wireless processing unit 234 performs wireless processing on the signal received via the antenna 235. The wireless processing performed by the wireless processing unit 234 includes, for example, processing of converting the frequency of the reception signal from the frequency of the unlicensed band to the frequency of baseband. The wireless processing unit 234 outputs the reception signal subjected to the wireless processing to the FFT processing unit 233 and the carrier sense unit 205.

The FFT processing unit 233 performs FFT processing on the reception signal output from the wireless processing unit 234. As a result, the reception signal whose frequency is converted from the unlicensed band to the baseband is converted from the time domain to the frequency domain. The FFT processing unit 233 outputs the reception signal subjected to the FFT processing to the demodulating unit 232.

The demodulating unit 232 demodulates the reception signal output from the FFT processing unit 233. The demodulating unit 232 then outputs the demodulated reception signal to the decoding unit 231. The decoding unit 231 decodes the reception signal output from the demodulating unit 232. The decoding unit 241 then outputs the decoded data to the MAC•RLC processing unit 204.

The carrier sense unit 205 measures interference power in the unlicensed band based on the reception signal output from the wireless processing unit 234, and determines whether the unlicensed band is idle or busy based on the measurement result. The carrier sense unit 205 then outputs the determination result to the uplink managing unit 202. The carrier sense unit 205 receives, for example, timing information on the start and the end of the carrier sense and information on a predetermined idle period or the like from the uplink managing unit 202, and sends back information as to whether it can be determined as idle by the time of delimiter timing to the uplink managing unit 202.

The MAC•RLC processing unit 204 performs processing in a MAC layer and processing in an RLC layer based on the data output from the decoding unit 231 and the decoding unit 241. The MAC•RLC processing unit 204 outputs the data obtained through the processing in the layers to, for example, a higher-level device of the base station 20. Moreover, the MAC•RLC processing unit 204 outputs the control information included in the data obtained through the processing of the layers to the RRC control unit 203.

The RRC control unit 203 performs wireless resource control based on the control information output from the MAC•RLC processing unit 204. The RRC control unit 203 generates control information based on the wireless resource control and outputs the generated control information to the uplink managing unit 202.

The uplink managing unit 202 controls the MAC layer based on the control information output from the RRC control unit 203. When a data transmission request to the terminal 30 occurs, the uplink managing unit 202 creates a UL grant to request data transmission in UL. The uplink managing unit 202 then transmits the UL grant to the terminal 30 by outputting the control signal including the created UL grant to a multiplexing unit 213 which is explained later.

The UL grant includes subband information, offset, and time limit information which are used for data transmission by the terminal 30. In the present embodiment, the offset specifies a second transmission timing as a relative time from the first transmission timing using, for example, a value of 2 bits. For example, when the value of 2 bits is "01", the offset indicates that the second transmission timing is a timing after one subframe from the first transmission timing. For example, when the value of 2 bits is "10", the offset indicates that the second transmission timing is a timing after two subframes from the first transmission timing. For example, when the value of 2 bits is "11", the offset indicates that the second transmission timing is a timing after three subframes from the first transmission timing. In addition, for example, when the value of 2 bits is "00", the offset indicates that the terminal 30 cancels data transmission when the terminal 30 does not receive the permission signal by the time of the first transmission timing after the reception of the UL grant 40.

For example, a case is considered in which the terminal 30 receives the UL grant 40 in which "11" is set as the offset, does not receive the permission signal by the time of the first transmission timing after the reception of the UL grant 40, and receives the permission signal after seven subframes from the first transmission timing. In this case, the terminal 30 calculates a remainder obtained by dividing, for example, 7 by 3 as the value of the offset, and subtracts the obtained value from 3 as the value of the offset. The terminal 30 then specifies a period of subframe after the remaining number of subframe periods as the second transmission timing. Then, the terminal 30 performs the UL data transmission at the specified second transmission timing. Because the remainder obtained by dividing 7 by 3 being the offset value is 1, the terminal 30 performs UL data transmission in, for example, the period of the subframe after two subframes from the subframe in which the permission signal is received.

In the present embodiment, either one of two periods is specified in the time limit information according to, for example, the value of 1 bit. For example, when the value of 1 bit is "0", the time limit information indicates that the timing after five subframes from the first transmission timing is a time limit. For example, when the value of 1 bit is "1", the time limit information indicates that the timing after 10 subframes from the first transmission timing is a time limit. In the present embodiment, the time limit information is valid when a value other than "00" is set in the offset. It may be configured that an arbitrary value can be specified using 3 bits or more as the offset and the time limit information.

The uplink managing unit 202 transmits the UL grant to the terminal 30, thereafter generates the permission signal, and outputs the generated permission signal to a multiplexing unit 223 which is explained later. The uplink managing unit 202 then causes the carrier sense unit 205 to execute LBT of the unlicensed band before UL data transmission timing by the terminal 30. Then, when the unlicensed band is detected idle, the carrier sense unit 205 instructs an IFFT processing unit 224, explained later, to transmit the transmission signal. Accordingly, the permission signal is transmitted to the unlicensed band.

The packet generating unit 200 generates a packet including user data output from a higher-level device. The packet generating unit 200 then outputs the generated packet to the MAC scheduling unit 201.

The MAC scheduling unit 201 performs scheduling in the MAC layer on the packet output from the packet generating unit 200. The MAC scheduling unit 201 then controls the output of the packet generated by the packet generating unit 200 to the licensed band transmitting unit 210 or to the unlicensed band transmitting unit 220 based on the result of the scheduling.

The licensed band transmitting unit 210 performs processing of data transmission in the licensed band. The licensed band transmitting unit 210 includes an encoding unit 211, a modulating unit 212, the multiplexing unit 213, an IFFT (Inverse FFT) processing unit 214, and a wireless processing unit 215.

The encoding unit 211 encodes the data of the packet output from the MAC scheduling unit 201. The encoding unit 211 then outputs the encoded data of the packet to the modulating unit 212. The modulating unit 212 modulates the data output from the encoding unit 211. The modulating unit 212 then outputs the modulated signal to the multiplexing unit 213.

The multiplexing unit 213 multiplexes the control signal including the UL grant etc. output from the uplink managing unit 202 and the signal output from the modulating unit 212. The multiplexing unit 213 then outputs the multiplexed transmission signal to the IFFT processing unit 214.

The IFFT processing unit 214 performs IFFT processing on the transmission signal output from the multiplexing unit 213. As a result, the transmission signal output from the multiplexing unit 213 is converted from the frequency domain to the time domain. The IFFT processing unit 214 outputs the transmission signal subjected to the IFFT processing to the wireless processing unit 215.

The wireless processing unit 215 performs wireless processing on the transmission signal output from the IFFT processing unit 214. The wireless processing performed by the wireless processing unit 215 includes, for example, processing of converting the frequency of the transmission signal from the frequency of the baseband to the frequency of the licensed band. The wireless processing unit 215 transmits the transmission signal subjected to the wireless processing from the antenna 216.

The unlicensed band transmitting unit 220 performs processing of transmitting data in the unlicensed band. The unlicensed band transmitting unit 220 includes an encoding unit 221, a modulating unit 222, the multiplexing unit 223, the IFFT processing unit 224, and a wireless processing unit 225.

The encoding unit 221 encodes the data of the packet output from the MAC scheduling unit 201. The encoding unit 221 then outputs the encoded data of the packet to the modulating unit 222. The modulating unit 222 modulates the data of the packet output from the encoding unit 221. The modulating unit 222 then outputs the modulated signal to the multiplexing unit 223.

The multiplexing unit 223 multiplexes the control signal including the permission signal etc. output from the uplink managing unit 202 and the signal output from the modulating unit 222. The multiplexing unit 223 then outputs the multiplexed transmission signal to the IFFT processing unit 224.

The IFFT processing unit 224 performs IFFT processing on the transmission signal output from the multiplexing unit 223. As a result, the transmission signal output from the multiplexing unit 223 is converted from the frequency domain to the time domain. When transmission of the transmission signal is instructed from the carrier sense unit 205, the IFFT processing unit 224 outputs the transmission signal subjected to the IFFT processing to the wireless processing unit 225.

The wireless processing unit 225 performs wireless processing on the transmission signal output from the IFFT processing unit 224. The wireless processing performed by the wireless processing unit 225 includes, for example, processing of converting the frequency of the transmission signal from the frequency of the baseband to the frequency of the unlicensed band. The wireless processing unit 225 transmits the transmission signal subjected to the wireless processing from the antenna 226.

Terminal 30

Figure 5:
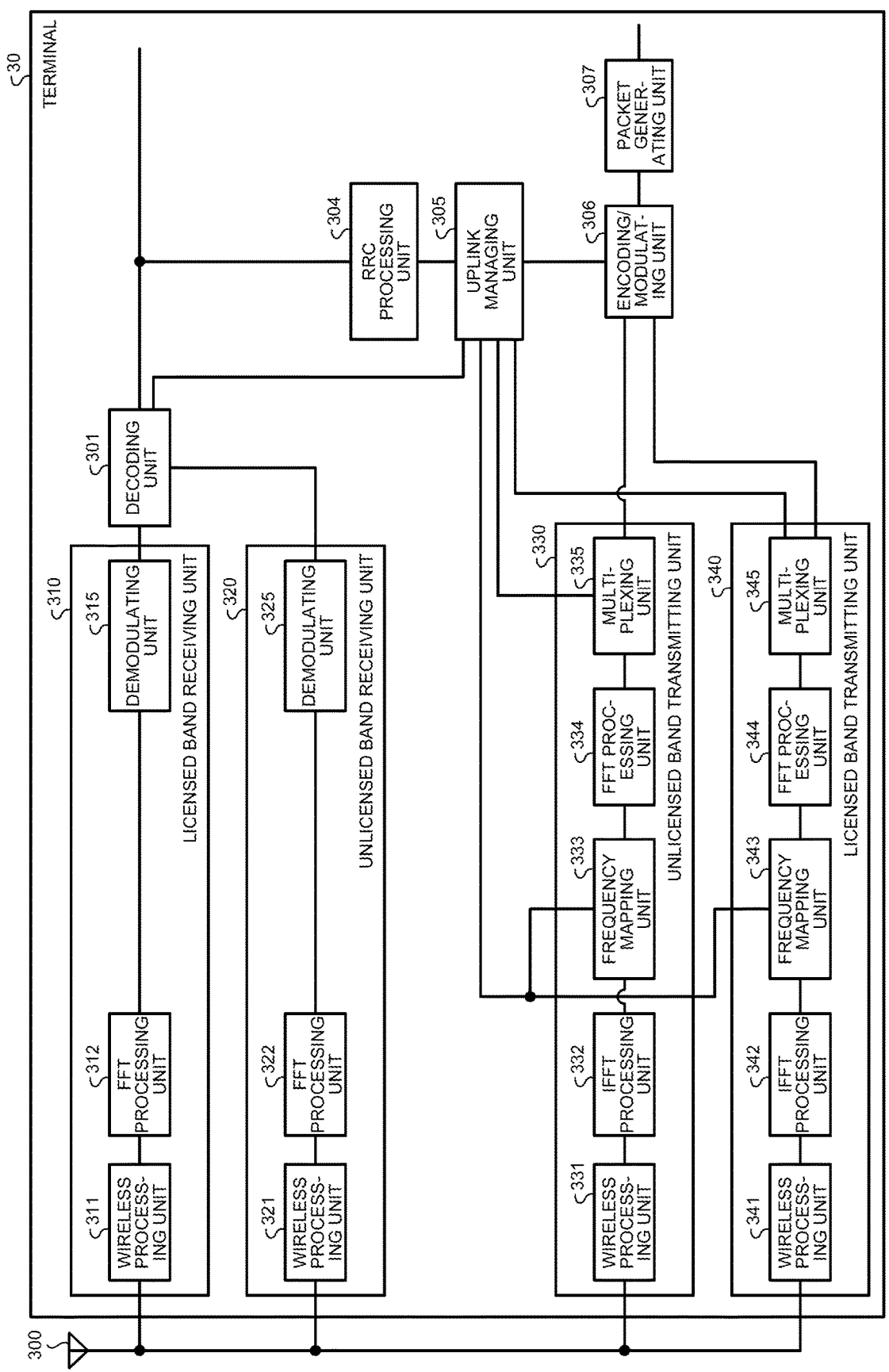
FIG. 5 is a block diagram illustrating an example of a terminal according to the first embodiment.

FIG. 5 is a block diagram illustrating an example of the terminal 30 according to the first embodiment. The terminal 30 includes an antenna 300, a decoding unit 301, an RRC processing unit 304, an uplink managing unit 305, an encoding/modulating unit 306, and a packet generating unit 307. The terminal 30 also includes a licensed band receiving unit 310, an unlicensed band receiving unit 320, an unlicensed band transmitting unit 330, and a licensed band transmitting unit 340.

The antenna 300 may be separately provided in each of the licensed band receiving unit 310, the unlicensed band receiving unit 320, the unlicensed band transmitting unit 330, and the licensed band transmitting unit 340.

The licensed band receiving unit 310 performs processing of decoding data from the signal received in the licensed band. The licensed band receiving unit 310 includes a wireless processing unit 311, an FFT processing unit 312, and a demodulating unit 315.

The wireless processing unit 311 performs wireless processing on the signal received via the antenna 300. The wireless processing performed by the wireless processing unit 311 includes, for example, processing of converting the frequency of the reception signal from the frequency of the licensed band to the frequency of baseband. The wireless processing unit 311 outputs the reception signal subjected to the wireless processing to the FFT processing unit 312.

The FFT processing unit 312 performs FFT processing on the reception signal output from the wireless processing unit 311. As a result, the reception signal output from the wireless processing unit 311 is converted from the time domain to the frequency domain. The FFT processing unit 312 outputs the reception signal subjected to the FFT processing to the demodulating unit 315.

The demodulating unit 315 demodulates the reception signal by performing equalization processing on the signal output from the FFT processing unit 312. The demodulating unit 315 then outputs the demodulated reception signal to the decoding unit 301. The data decoded from the reception signal demodulated by the licensed band receiving unit 310 includes the control signal including the UL grant etc.

The unlicensed band receiving unit 320 performs processing of demodulating data from the signal received in the unlicensed band. The unlicensed band receiving unit 320 includes a wireless processing unit 321, an FFT processing unit 322, and a demodulating unit 325.

The wireless processing unit 321 performs wireless processing on the signal received via the antenna 300. The wireless processing performed by the wireless processing unit 321 includes, for example, processing of converting the frequency of the reception signal from the frequency of the unlicensed band to the frequency of the baseband. The wireless processing unit 321 outputs the reception signal subjected to the wireless processing to the FFT processing unit 322.

The FFT processing unit 322 performs FFT processing on the reception signal output from the wireless processing unit 321. As a result, the reception signal output from the wireless processing unit 321 is converted from the time domain to the frequency domain. The FFT processing unit 322 then outputs the reception signal subjected to the FFT processing to the demodulating unit 325.

The demodulating unit 325 demodulates the reception signal by performing equalization processing on the signal output from the FFT processing unit 322. The demodulating unit 325 then outputs the demodulated reception signal to the decoding unit 301. The data decoded from the reception signal demodulated by the unlicensed band receiving unit 320 includes the control signal including the permission signal etc.

The decoding unit 301 decodes the user data and the control signal from the reception signals output from the licensed band receiving unit 310 and the unlicensed band receiving unit 320. The decoding unit 301 then outputs the decoded user data to an application processor (not illustrated) that performs processing based on, for example, the received data. In addition, the decoding unit 301 outputs the decoded control signal to the RRC processing unit 304 and the uplink managing unit 305. The control signal output to the uplink managing unit 305 includes the UL grant and the permission signal etc.

The RRC processing unit 304 performs wireless resource control based on the control information output from the decoding unit 301. The RRC processing unit 304 generates control information based on the wireless resource control and outputs the generated control information to the uplink managing unit 305.

The uplink managing unit 305 controls UL based on the control information output from the RRC processing unit 304 and the control signal output from the decoding unit 301. For example, when a UL grant is output from the decoding unit 301, the uplink managing unit 305 acquires subband information, offset, and time limit information of the unlicensed band allocated to UL data transmission from the UL grant.

The uplink managing unit 305 determines whether the permission signal is output from the decoding unit 301 for a period before the first transmission timing after the predetermined period since the output of the UL grant from the decoding unit 301. When the permission signal is output from the decoding unit 301 for a period before the first transmission timing after the predetermined period since the output of the UL grant from the decoding unit 301, the uplink managing unit 305 instructs the encoding/modulating unit 306 to perform data transmission at the first transmission timing.

On the other hand, when the permission signal is not output from the decoding unit 301 for a period before the first transmission timing after the output of the UL grant from the decoding unit 301, the uplink managing unit 305 determines whether the permission signal is output from the decoding unit 301 before the time limit indicated by the time limit information. When the permission signal is output from the decoding unit 301 before the time limit indicated by the time limit information, the uplink managing unit 305 specifies the second transmission timing at which UL data transmission is performed based on the first transmission timing after the reception of the UL grant. The uplink managing unit 305 then instructs the encoding/modulating unit 306 to perform data transmission at the specified second transmission timing.

For example, a case is considered in which the UL grant 40 including the offset for specifying the period of three subframes is received and the permission signal is received after seven subframes from the first transmission timing. In this case, for example, the uplink managing unit 305 specifies the timing after nine subframes from the first transmission timing as the second transmission timing.

The uplink managing unit 305 outputs resource allocation information used for the UL data transmission to a frequency mapping unit 333 and a frequency mapping unit 343, which are explained later.

The packet generating unit 307 generates a packet including the user data output from, for example, the application processor (not illustrated). The packet generating unit 307 then outputs the generated packet to the encoding/modulating unit 306. The encoding/modulating unit 306 performs encoding and modulation processing on the packet output from the packet generating unit 307. The encoding/modulating unit 306 then outputs the transmission signal subjected to the encoding and modulation processing to the unlicensed band transmitting unit 330 or to the licensed band transmitting unit 340 according to the instruction from the uplink managing unit 305.

The licensed band transmitting unit 340 performs processing of transmitting data in the licensed band. The licensed band transmitting unit 340 includes a wireless processing unit 341, an IFFT processing unit 342, a frequency mapping unit 343, an FFT processing unit 344, and a multiplexing unit 345.

The multiplexing unit 345 multiplexes the control signal output from the uplink managing unit 305 and the transmission signal output from the encoding/modulating unit 306. The multiplexing unit 345 then outputs the multiplexed transmission signal to the FFT processing unit 344. The FFT processing unit 344 performs FFT processing on the transmission signal output from the multiplexing unit 345. As a result, the transmission signal output from the multiplexing unit 345 is converted from the time domain to the frequency domain. The FFT processing unit 344 outputs the transmission signal subjected to the FFT processing to the frequency mapping unit 343.

The frequency mapping unit 343 performs frequency mapping on the transmission signal output from the FFT processing unit 344 based on the UL resource allocation information output from the uplink managing unit 305. The frequency mapping unit 343 then outputs the transmission signal subjected to the frequency mapping to the IFFT processing unit 342.

The IFFT processing unit 342 performs IFFT processing on the transmission signal output from the frequency mapping unit 343. As a result, the transmission signal output from the frequency mapping unit 343 is converted from the frequency domain to the time domain. The IFFT processing unit 342 outputs the transmission signal subjected to the IFFT processing to the wireless processing unit 341.

The wireless processing unit 341 performs wireless processing on the transmission signal output from the IFFT processing unit 342. The wireless processing performed by the wireless processing unit 341 includes, for example, processing of converting the frequency of the transmission signal from the frequency of the baseband to the frequency of the licensed band. The wireless processing unit 341 transmits the transmission signal subjected to the wireless processing via the antenna 300.

The unlicensed band transmitting unit 330 performs processing of transmitting data in the unlicensed band. The unlicensed band transmitting unit 330 includes a wireless processing unit 331, an IFFT processing unit 332, the frequency mapping unit 333, an FFT processing unit 334, and a multiplexing unit 335.

The multiplexing unit 335 multiplexes the control signal output from the uplink managing unit 305 and the signal output from the encoding/modulating unit 306. The multiplexing unit 335 then outputs the multiplexed transmission signal to the FFT processing unit 334. The FFT processing unit 334 performs FFT processing on the transmission signal output from the multiplexing unit 335. As a result, the transmission signal output from the multiplexing unit 335 is converted from the time domain to the frequency domain. The FFT processing unit 334 outputs the transmission signal subjected to the FFT processing to the frequency mapping unit 333.

The frequency mapping unit 333 performs frequency mapping on the transmission signal output from the FFT processing unit 334 based on the UL resource allocation information output from the uplink managing unit 305. The frequency mapping unit 333 then outputs the transmission signal subjected to the frequency mapping to the IFFT processing unit 332.

The IFFT processing unit 332 performs IFFT processing on the transmission signal output from the frequency mapping unit 333. As a result, the transmission signal output from the frequency mapping unit 333 is converted from the frequency domain to the time domain. The IFFT processing unit 332 outputs the transmission signal subjected to the IFFT processing to the wireless processing unit 331.

The wireless processing unit 331 performs wireless processing on the transmission signal output from the IFFT processing unit 332. The wireless processing performed by the wireless processing unit 331 includes, for example, processing of converting the frequency of the transmission signal from the frequency of the baseband to the frequency of the unlicensed band. The wireless processing unit 331 transmits the transmission signal subjected to the wireless processing via the antenna 300.

Operation of Base Station 20

Figure 6:
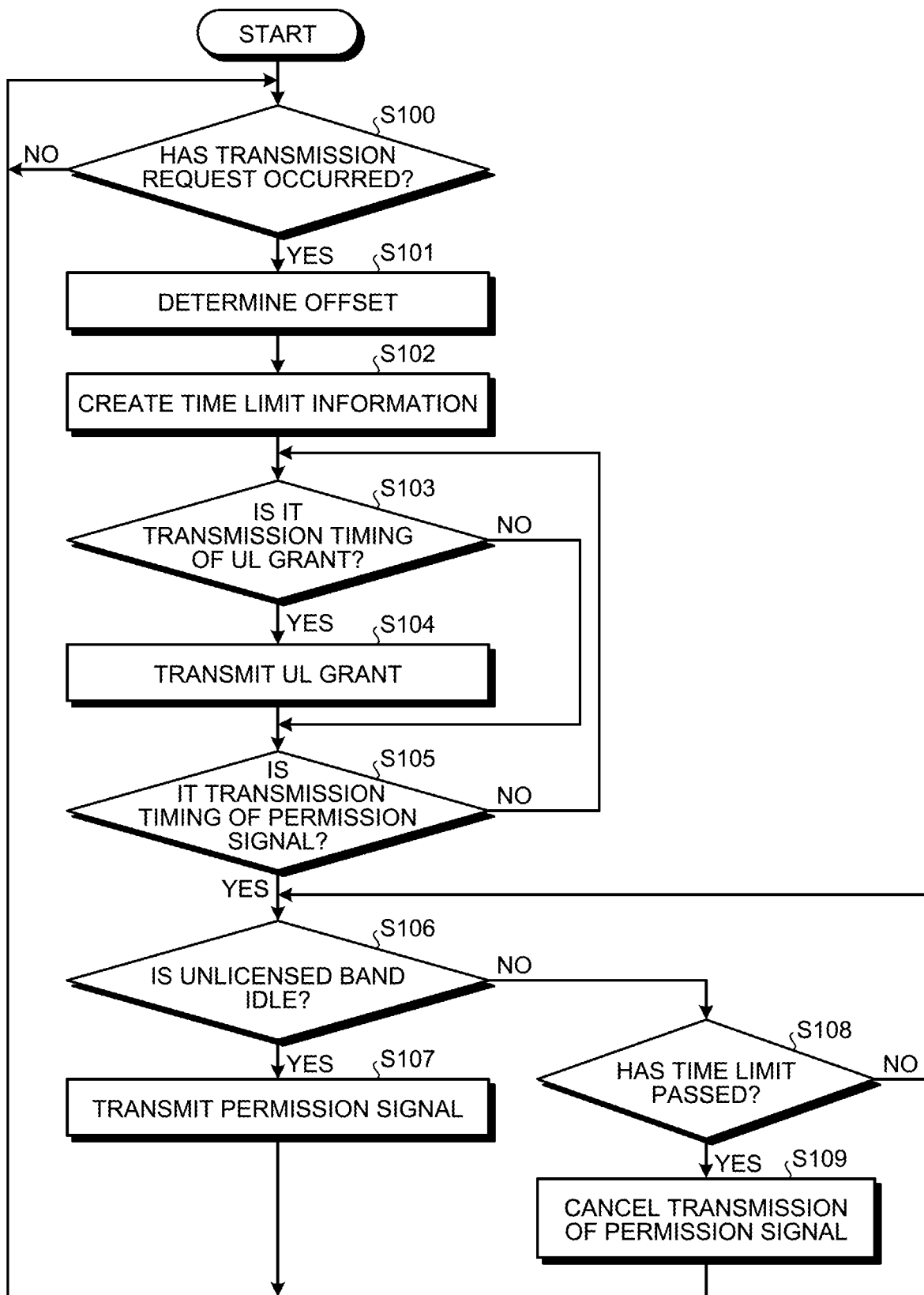
FIG. 6 is a flowchart illustrating an example of an operation of the base station according to the first embodiment.

The operation of the base station 20 will be explained next. FIG. 6 is a flowchart illustrating an example of the operation of the base station 20 according to the first embodiment.

First of all, the uplink managing unit 202 determines whether a data transmission request to the terminal 30 has occurred (S100). When a data transmission request to the terminal 30 has occurred (Yes at S100), the uplink managing unit 202 determines the value of the offset (S101). The uplink managing unit 202 determines, for example, the number of continuous subframes to be allocated to data transmission in the same subband as the value of offset.

Then, the uplink managing unit 202 creates time limit information (S102). The uplink managing unit 202 then creates a UL grant that includes the determined offset and the created time limit information and also includes subband information of the unlicensed band allocated to the UL data transmission. Then, the uplink managing unit 202 determines whether it is a transmission timing of the UL grant (S103). When the continuous subframes are to be allocated to the data transmission, the uplink managing unit 202 transmits the UL grant at each timing of the continuous subframes.

When it is not a transmission timing of the UL grant (No at S103), the uplink managing unit 202 executes the process illustrated at Step S105. Meanwhile, when it is a transmission timing of the UL grant (Yes at S103), the uplink managing unit 202 transmits the UL grant to the terminal 30 via the licensed band transmitting unit 210 (S104). The uplink managing unit 202 then determines whether it is a transmission timing of the permission signal (S105). When a period of, for example, three subframes has passed from the subframe in which the UL grant is transmitted at Step S104, the uplink managing unit 202 determines that it is a transmission timing of the permission signal.

When it is not a transmission timing of the permission signal (No at S105), the uplink managing unit 202 again executes the process illustrated at Step S103. Meanwhile, when it is a transmission timing of the UL grant (Yes at S105), the uplink managing unit 202 outputs the permission signal to the multiplexing unit 223 and instructs the carrier sense unit 205 to perform carrier sense. The carrier sense unit 205 executes the carrier sense and determines whether the unlicensed band is idle (S106). When the unlicensed band is idle (Yes at S106), the carrier sense unit 205 instructs the IFFT processing unit 224 to transmit the transmission signal. As a result, the permission signal is transmitted to the unlicensed band (S107). The uplink managing unit 202 then again executes the process illustrated at Step S100.

Meanwhile, when the unlicensed band is busy (No at S106), the uplink managing unit 202 refers to the time limit information including the UL grant to determine whether the time limit has passed (S108). When the time limit has not passed (No at S108), the uplink managing unit 202 again executes the process illustrated at Step S106. Meanwhile, when the time limit has passed (Yes at S108), the uplink managing unit 202 cancels the transmission of the permission signal (S109). The uplink managing unit 202 then again executes the process illustrated at Step S100.

Operation of Terminal 30

Figure 7:
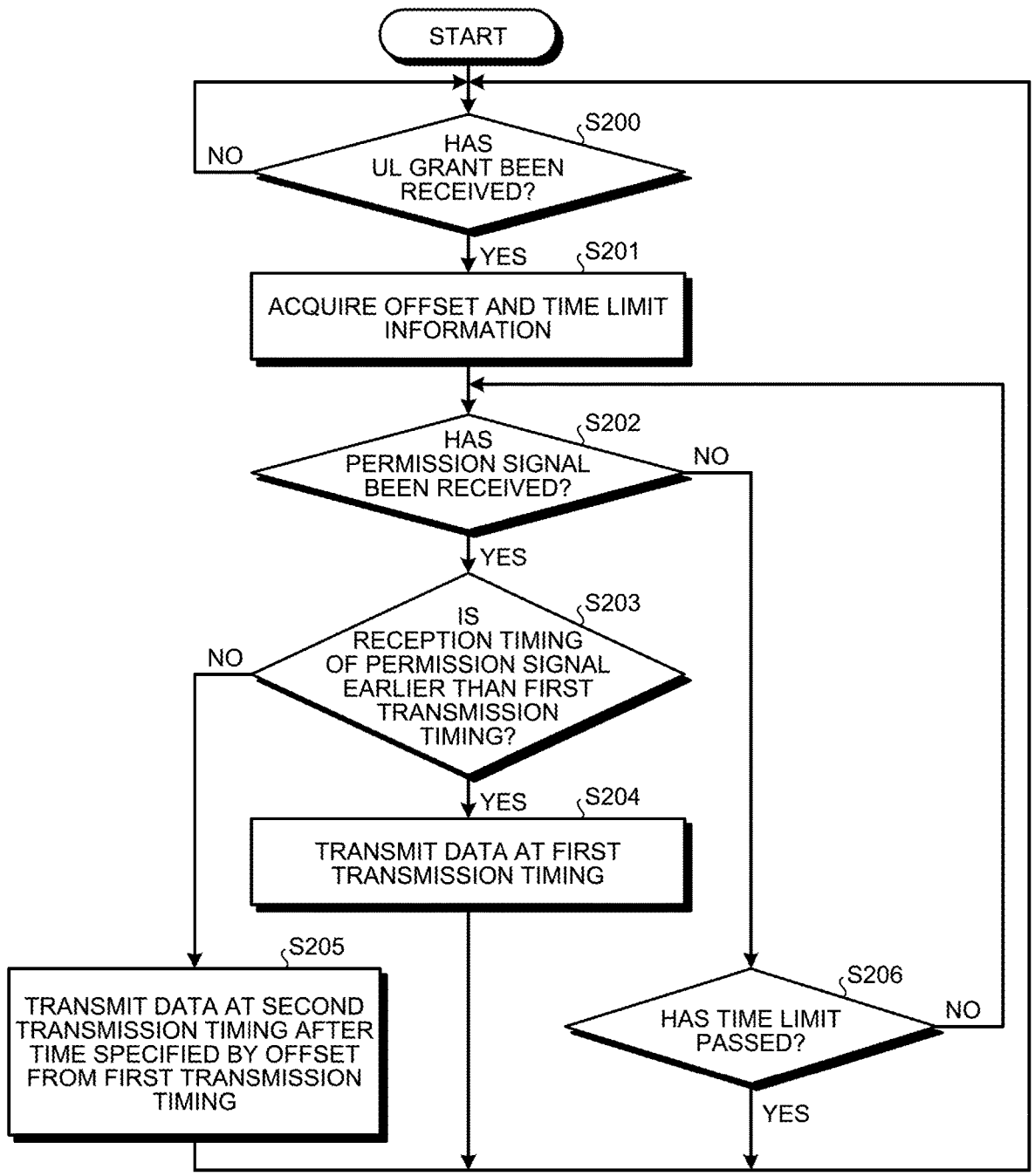
FIG. 7 is a flowchart illustrating an example of an operation of the terminal according to the first embodiment.

The operation of the terminal 30 will be explained next. FIG. 7 is a flowchart illustrating an example of the operation of the terminal 30 according to the first embodiment.

First of all, the uplink managing unit 305 determines whether the UL grant has been received in the licensed band (S200). When the UL grant has been received (Yes at S200), the uplink managing unit 305 acquires the offset and the time limit information from the received UL grant (S201).

Then, the uplink managing unit 305 determines whether the permission signal has been received (S202). When the permission signal has not been received (No at S202), the uplink managing unit 305 determines whether the time limit indicated by the time limit information acquired from the UL grant has passed (S206). When the time limit has not passed (No at S206), the uplink managing unit 305 again executes the process illustrated at Step S202. Meanwhile, when the time limit has passed (Yes at S206), the uplink managing unit 305 cancels the UL data transmission instructed by the UL grant, and again executes the process illustrated at Step S200.

When the permission signal has been received (Yes at S202), the uplink managing unit 305 determines whether the reception timing of the permission signal is a timing earlier than the first transmission timing after the reception of the UL grant (S203). When the reception timing of the permission signal is the timing earlier than the first transmission timing (Yes at S203), the uplink managing unit 305 transmits the data in UL in the subframe of the first transmission timing (S204). The uplink managing unit 305 then again executes the process illustrated at Step S200.

When the reception timing of the permission signal is the timing later than the first transmission timing (No at S203), the uplink managing unit 305 specifies the second transmission timing after the time specified by the offset from the first transmission timing. The uplink managing unit 305 then transmits the data in UL in the subframe of the specified second transmission timing (S205). Then, the uplink managing unit 305 again executes the process illustrated at Step S200.

Advantageous Effects of First Embodiment

The first embodiment has been explained above. As is apparent from the explanation, according to the wireless communication system 10 of the present embodiment, the throughput of UL in the unlicensed band can be improved.

[b] Second Embodiment

In the first embodiment, the offset is included in the UL grant, however, the present embodiment is different from the first embodiment in that the offset is included in the permission signal. Except for the points explained below, the functional blocks of the base station 20 and the terminal 30 are the same as the respective functional blocks explained with reference to FIG. 4 and FIG. 5, and therefore detailed explanation thereof is omitted.

Operation of Base Station 20

Figure 8:
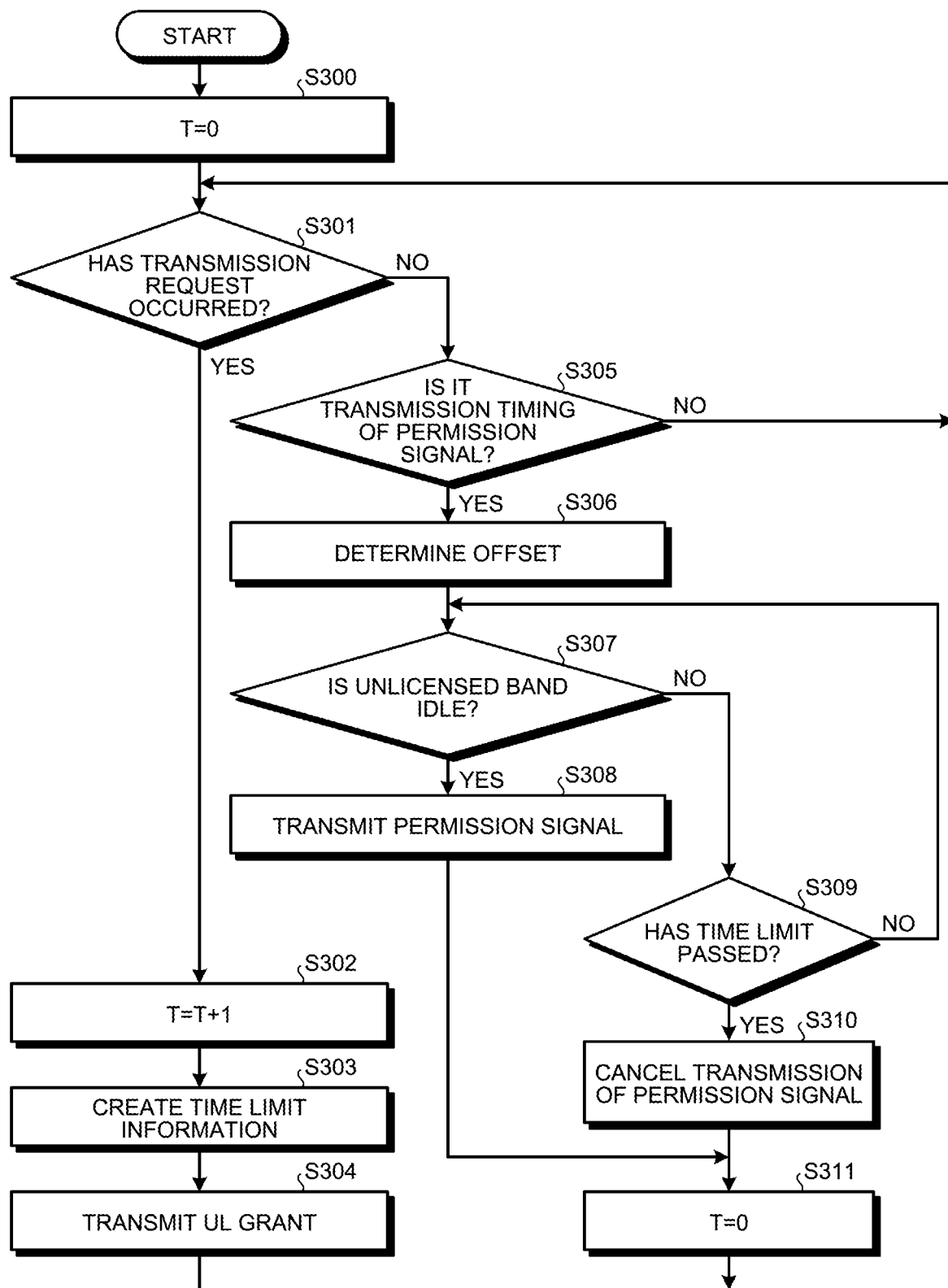
FIG. 8 is a flowchart illustrating an example of an operation of a base station according to a second embodiment.

FIG. 8 is a flowchart illustrating an example of an operation of the base station 20 according to a second embodiment.

First of all, the uplink managing unit 202 initializes a variable T indicating an offset to 0 (S300). The uplink managing unit 202 then determines whether a data transmission request to the terminal 30 has occurred (S301). When a data transmission request to the terminal 30 has occurred (Yes at S301), the uplink managing unit 202 increases the variable T by 1 (S302), and creates time limit information (S303).

Then, the uplink managing unit 202 creates a UL grant including the created time limit information and the subband information of the unlicensed band allocated to UL data transmission. The uplink managing unit 202 then transmits the created UL grant to the terminal 30 via the licensed band transmitting unit 210 (S304). Then, the uplink managing unit 202 again executes the process illustrated at Step S301.

When a data transmission request to the terminal 30 has not occurred (No at S301), the uplink managing unit 202 determines whether it is a transmission timing of the permission signal (S305). When it is not a transmission timing of the permission signal (No at S305), the uplink managing unit 202 again executes the process illustrated at Step S301.

Meanwhile, when it is a transmission timing of the permission signal (Yes at S305), the uplink managing unit 202 determines the value of the variable T as the value of the offset (S306). The uplink managing unit 202 then creates the permission signal including the value of the determined offset and outputs the created permission signal to the multiplexing unit 223. Then the uplink managing unit 202 instructs the carrier sense unit 205 to perform carrier sense. The carrier sense unit 205 executes carrier sense and determines whether the unlicensed band is idle (S307).

When the unlicensed band is idle (Yes at S307), the carrier sense unit 205 instructs the IFFT processing unit 224 to transmit the transmission signal. As a result, the permission signal is transmitted to the unlicensed band (S308). Then the uplink managing unit 202 initializes the value of the variable T to 0 (S311), and again executes the process illustrated at Step S301.

Meanwhile, when the unlicensed band is busy (No at S307), the uplink managing unit 202 refers to the time limit information including the UL grant to determine whether the time limit has passed (S309). When the time limit has not passed (No at S309), the uplink managing unit 202 again executes the process illustrated at Step S307. Meanwhile, when the time limit has passed (Yes at S309), the uplink managing unit 202 cancels the transmission of the permission signal (S310). The uplink managing unit 202 then again executes the process illustrated at Step S311.

Operation of Terminal 30

Figure 9:
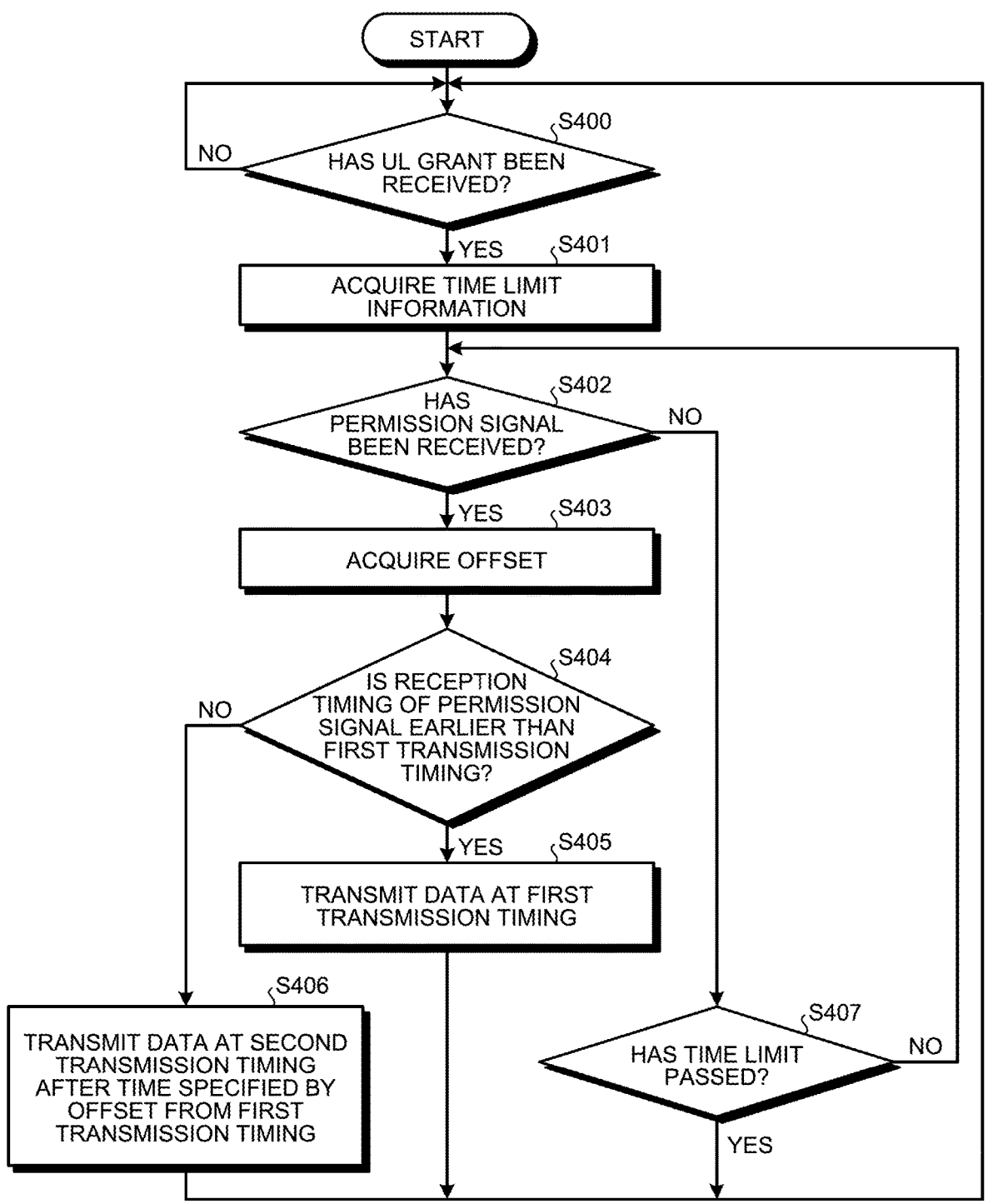
FIG. 9 is a flowchart illustrating an example of an operation of a terminal according to the second embodiment.

FIG. 9 is a flowchart illustrating an example of an operation of the terminal 30 according to the second embodiment.

First of all, the uplink managing unit 305 determines whether the UL grant has been received in the licensed band (S400). When the UL grant has been received (Yes at S400), the uplink managing unit 305 acquires the time limit information from the received UL grant (S401).

Then, the uplink managing unit 305 determines whether the permission signal has been received (S402). When the permission signal has not been received (No at S402), the uplink managing unit 305 determines whether the time limit indicated by the time limit information acquired from the UL grant has passed (S407). When the time limit has not passed (No at S407), the uplink managing unit 305 again executes the process illustrated at Step S402. Meanwhile, when the time limit has passed (Yes at S407), the uplink managing unit 305 cancels the UL data transmission instructed by the UL grant, and again executes the process illustrated at Step S400.

When the permission signal has been received (Yes at S402), the uplink managing unit 305 acquires an offset from the permission signal (S403). The uplink managing unit 305 then determines whether the reception timing of the permission signal is a timing earlier than the first transmission timing after the reception of the UL grant (S404). When the reception timing of the permission signal is the timing earlier than the first transmission timing (Yes at S404), the uplink managing unit 305 transmits the data in the subframe of the first transmission timing (S405). The uplink managing unit 305 then again executes the process illustrated at Step S400.

Meanwhile, when the reception timing of the permission signal is the timing later than the first transmission timing (No at S404), the uplink managing unit 305 specifies the second transmission timing after the time specified by the offset from the first transmission timing. The uplink managing unit 305 then transmits the data in UL in the subframe of the specified second transmission timing (S406). Then, the uplink managing unit 305 again executes the process illustrated at Step S400.

Advantageous Effects of Second Embodiment

The second embodiment has been explained above. As is apparent from the explanation, according to the wireless communication system 10 of the present embodiment, the throughput of UL in the unlicensed band can be improved. Moreover, in the present embodiment, because it is sufficient that the value of the offset is determined by the time of transmission of the permission signal, the value of the offset can be determined more flexibly according to the data transmission timing of UL allocated to the terminal 30.

[c] Third Embodiment

In the first embodiment, the base station 20 performs LBT of the unlicensed band before the terminal 30 performs UL data transmission, however, the present embodiment is different from the first embodiment in that the terminal 30 itself performs LBT of the unlicensed band before the terminal 30 performs UL data transmission.

Operation of Wireless Communication System 10

Figure 10:
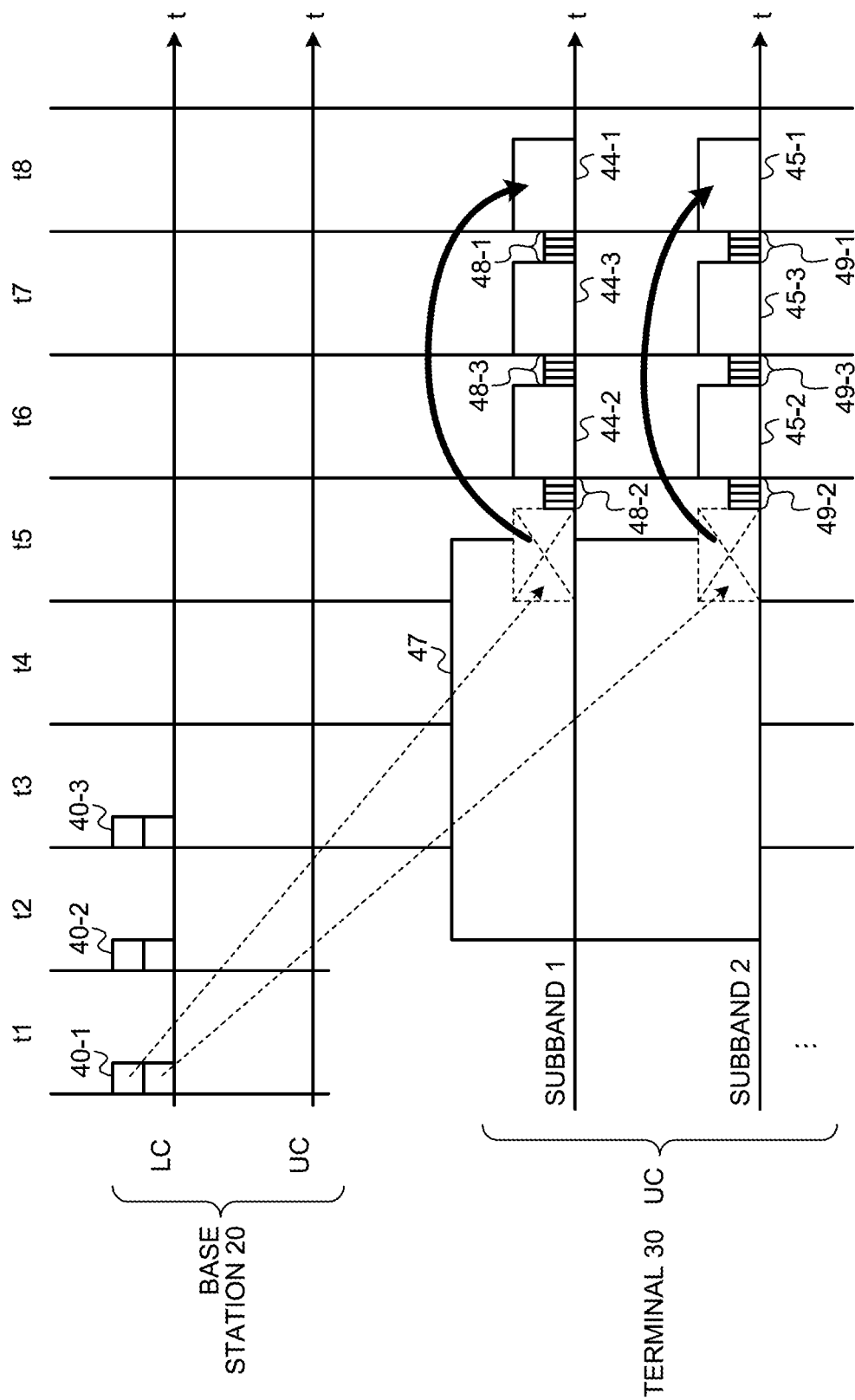
FIG. 10 is a diagram illustrating an example of an operation of a wireless communication system according to a third embodiment.

FIG. 10 is a diagram illustrating an example of an operation of the wireless communication system 10 according to a third embodiment. Except for the points explained below, the elements in FIG. 10 assigned with the same reference signs as these in FIG. 2 or FIG. 3 are the same as the elements illustrated in FIG. 2 or FIG. 3, and therefore explanation thereof is omitted.

In the present embodiment, when receiving the UL grant 40 from the base station 20, each terminal 30 executes LBT in the unlicensed band before a predetermined time (for example, before one subframe) than the first transmission timing after the reception of the UL grant 40. Each terminal 30 performs UL data transmission at the first transmission timing after it is checked that the unlicensed band is continuously idle for a predetermined back-off period.

Meanwhile, when the unlicensed band is not detected idle earlier than the first transmission timing after the reception of the UL grant 40, the terminal 30 postpones the LBT up to the timing before the predetermined time than the second transmission timing specified by the offset. When the unlicensed band is detected idle in restarted LBT, the terminal 30 performs the UL data transmission at the second transmission timing after the period specified by the offset included in the UL grant 40 from the first transmission timing.

As illustrated in FIG. 10, when other signal 47 is transmitted to the unlicensed band in the subframe period t4 after the predetermined time from the subframe in which the UL grant 40-1 is transmitted, the terminals 30a and 30b detect that the unlicensed band is busy. Then, the terminals 30a and 30b wait for the LBT from the subframe period t4 until the subframe period t7 before the subframe period t8 at the second transmission timing in which the period (period of three subframes in the example of FIG. 10) specified by the offset has passed.

The terminals 30a and 30b then restart the LBT in the subframe period t7. Then, when the unlicensed band is detected idle in the subframe period t7, the terminal 30a transmits the UL data 44-1 in the unlicensed band after it is checked that the idle state continues for a predetermined back-off period 48-1. Similarly, when the unlicensed band is detected idle in the subframe period t7, the terminal 30b also transmits the UL data 45-1 in the unlicensed band after it is checked that the idle state continues for a predetermined back-off period 49-1.

In this way, in the present embodiment, when the unlicensed band is not detected idle by the time of the first transmission timing after the reception of the UL grant, the terminal 30 waits from the first transmission timing until a predetermined time before the second transmission timing after the period specified by the offset. Then, the terminal 30 restarts the LBT at a timing before the predetermined time than the second transmission timing, and performs the UL data transmission at the second transmission timing when the unlicensed band is detected idle. As a result, when the unlicensed band is busy at the first transmission timing, the terminal 30 performs the UL data transmission after the unlicensed band is detected idle even if the UL grant is not retransmitted from the base station 20. This makes it possible to improve the throughput of UL. Moreover, because retransmission of the UL grant can be reduced, it is possible to reduce the processing load of the base station 20 and suppress an increase in traffic of the licensed band.

Base Station 20

Because the base station 20 according to the present embodiment is the same as the base station 20 according to the first embodiment explained with reference to FIG. 4 except for the points explained below, detailed explanation thereof is omitted. The base station 20 in the present embodiment is different from the base station 20 in the first embodiment in that it does not include the carrier sense unit 205. The uplink managing unit 202 in the present embodiment is different from the uplink managing unit 202 in the first embodiment in that if the UL grant is transmitted, the permission signal is not transmitted.

Terminal 30

Figure 11:
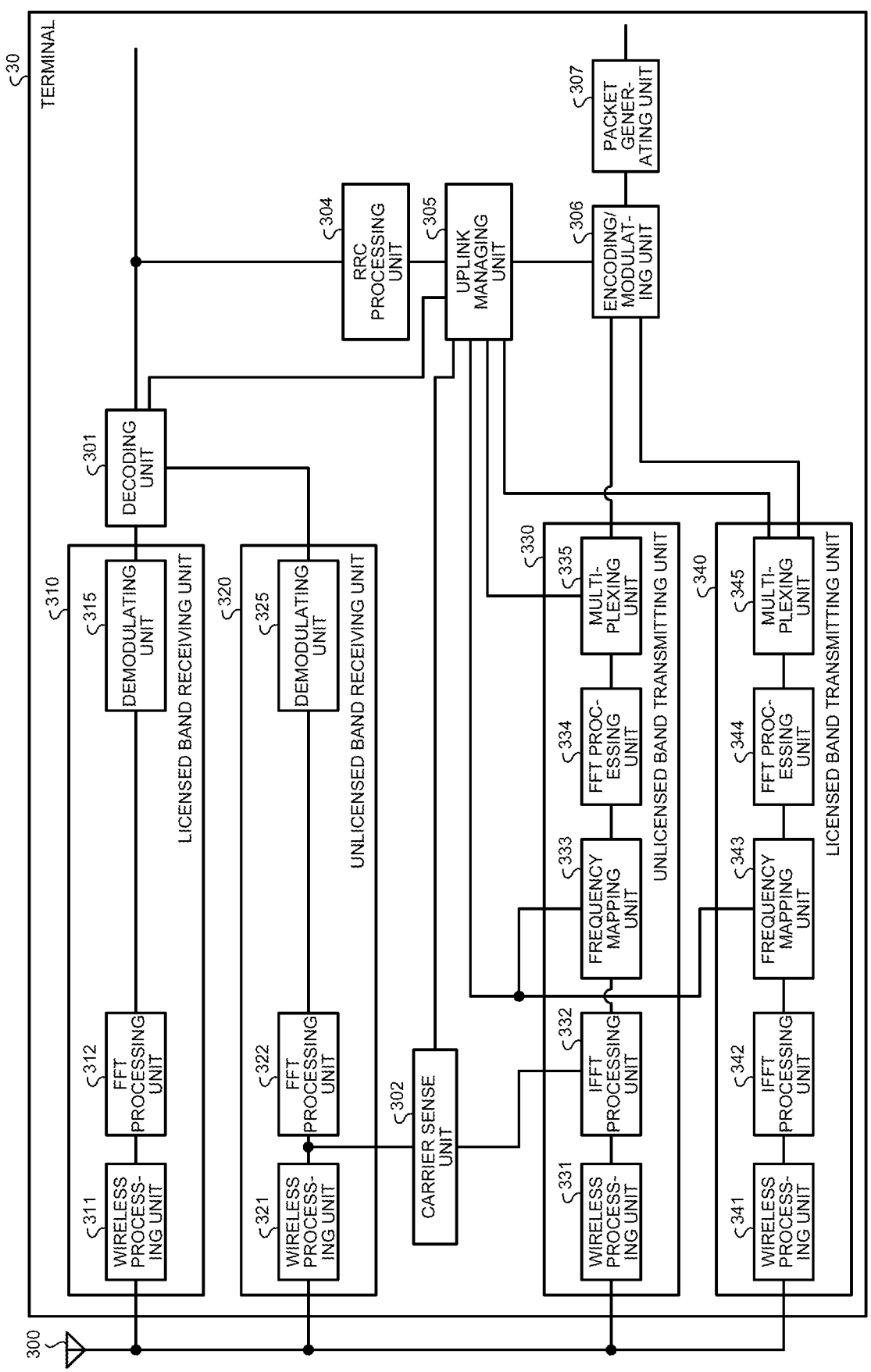
FIG. 11 is a block diagram illustrating an example of a terminal according to the third embodiment.

FIG. 11 is a block diagram illustrating an example of the terminal 30 according to the third embodiment. Except for the points explained below, the elements in FIG. 11 assigned with the same reference signs as these in FIG. 5 are the same as the elements explained with reference to FIG. 5, and therefore detailed explanation thereof is omitted. The terminal 30 in the present embodiment is different from the terminal 30 in the first embodiment in that it includes a carrier sense unit 302.

The carrier sense unit 302 measures interference power in the unlicensed band based on the reception signal output from the wireless processing unit 321 of the unlicensed band receiving unit 320. Then, the carrier sense unit 302 determines whether the unlicensed band is idle or busy based on the measurement result. The carrier sense unit 302 then outputs the determination result to the uplink managing unit 305. The carrier sense unit 302 receives, for example, timing information on the start and the end of the carrier sense and information on a predetermined idle period or the like from the uplink managing unit 305, and sends back information as to whether it can be determined as idle by the time of delimiter timing to the uplink managing unit 305.

When receiving the UL grant from the base station 20, the uplink managing unit 305 acquires the offset and the time limit information from the UL grant. In the present embodiment, the time limit information indicates a time limit that can postpone the data transmission of the terminal 30. The uplink managing unit 305 instructs the carrier sense unit 302 to perform carrier sense and execute LBT in the unlicensed band. When the unlicensed band is detected idle for a period before the first transmission timing after the reception of the UL grant, the uplink managing unit 305 checks that idle continues for a predetermined length of back-off period. When idle continues for the back-off period, the uplink managing unit 305 instructs the encoding/modulating unit 306 to perform UL data transmission at the first transmission timing. The carrier sense unit 302 instructs the IFFT processing unit 332 to transmit the transmission signal at the first transmission timing. As a result, the transmission signal is transmitted to the unlicensed band at the first transmission timing.

Meanwhile, when the unlicensed band is not detected idle until the first transmission timing, the uplink managing unit 305 specifies the second transmission timing after the period specified by the offset from the first transmission timing. The uplink managing unit 305 then instructs the carrier sense unit 302 to perform carrier sense at a timing before a predetermined time than the specified second transmission timing and again execute LBT in the unlicensed band. Then, when the unlicensed band is detected idle, the uplink managing unit 305 instructs the encoding/modulating unit 306 to perform data transmission at the second transmission timing. The carrier sense unit 302 instructs the IFFT processing unit 332 to transmit the transmission signal at the second transmission timing. As a result, the transmission signal is transmitted to the unlicensed band at the second transmission timing.

Operation of Base Station 20

Figure 12:
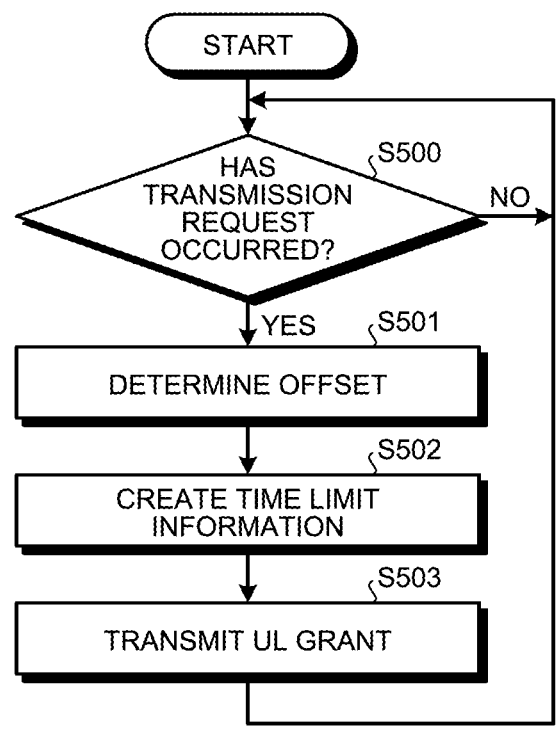
FIG. 12 is a flowchart illustrating an example of an operation of a base station according to the third embodiment.

FIG. 12 is a flowchart illustrating an example of an operation of the base station 20 according to the third embodiment.

First of all, the uplink managing unit 202 determines whether a data transmission request to the terminal 30 has occurred (S500). When a data transmission request to the terminal 30 has occurred (Yes at S500), the uplink managing unit 202 determines the value of the offset (S501). The uplink managing unit 202 determines, for example, the number of continuous subframes to be allocated to data transmission in the same subband as the value of offset.

Then, the uplink managing unit 202 creates time limit information (S502). The uplink managing unit 202 then creates a UL grant that includes the determined offset and the created time limit information and also includes subband information of the unlicensed band allocated to the UL data transmission. Then, the uplink managing unit 202 transmits the created UL grant to the terminal 30 via the licensed band transmitting unit 210 (S503). The uplink managing unit 202 then again executes the process illustrated at Step S500.

Operation of Terminal 30

Figure 13:
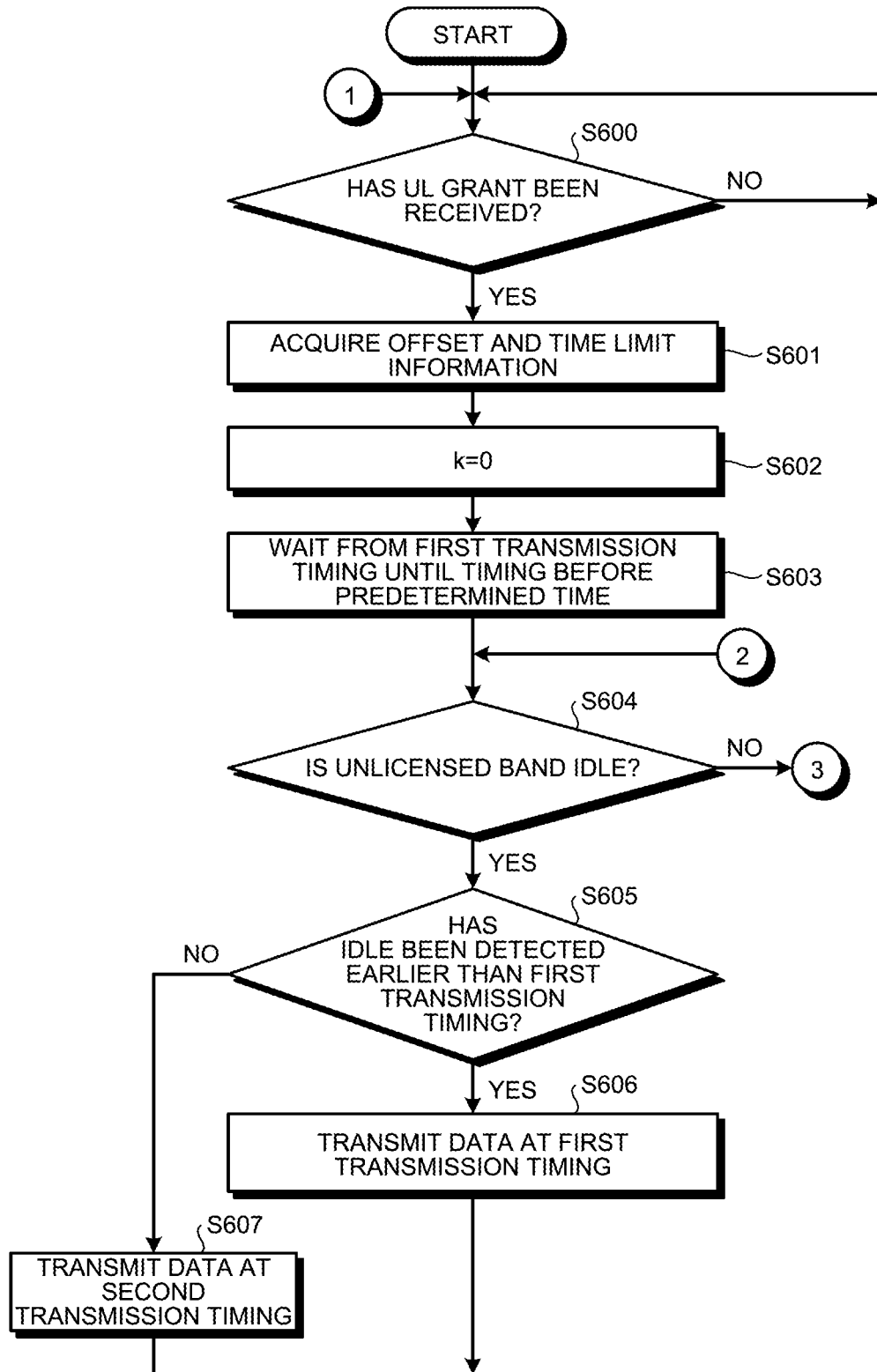
FIG. 13 is a flowchart illustrating an example of an operation of the terminal according to the third embodiment.
Figure 14:
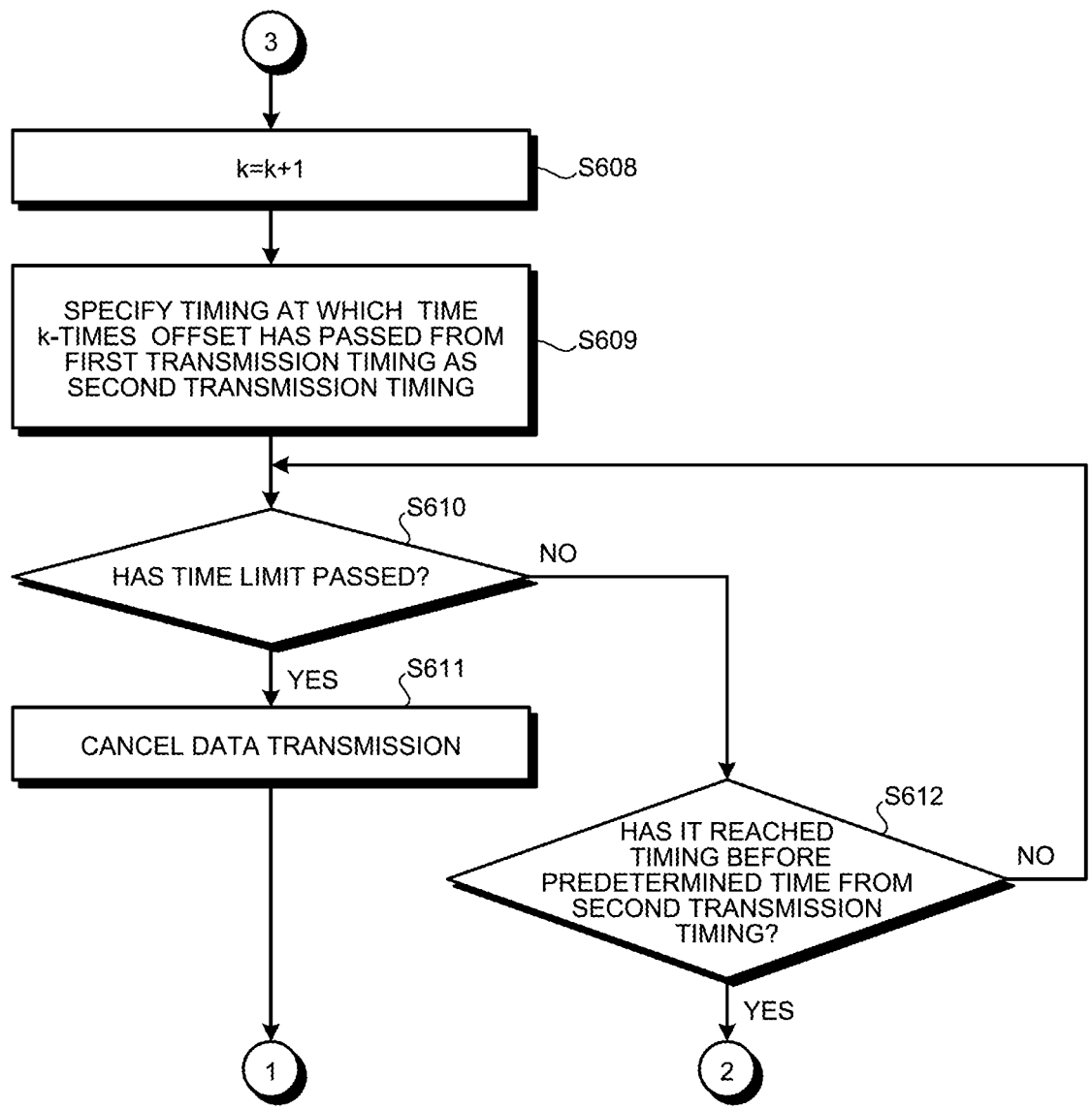
FIG. 14 is a flowchart illustrating an example of the operation of the terminal according to the third embodiment.

FIG. 13 and FIG. 14 are flowcharts illustrating an example of an operation of the terminal 30 according to the third embodiment.

First of all, the uplink managing unit 305 determines whether the UL grant has been received in the licensed band (S600). When the UL grant has been received (Yes at S600), the uplink managing unit 305 acquires the offset and the time limit information from the UL grant (S601). The uplink managing unit 305 then initializes a variable k to 0 (S602). Then, the uplink managing unit 305 waits from the first transmission timing after the reception of the UL grant until a timing before a predetermined time (S603).

Then, the uplink managing unit 305 instructs the carrier sense unit 302 to perform carrier sense. The carrier sense unit 302 executes carrier sense and determines whether the unlicensed band is idle (S604). When the unlicensed band is idle (Yes at S604), the uplink managing unit 305 determines whether the unlicensed band has been detected idle earlier than the first transmission timing (S605). When the unlicensed band has been detected idle earlier than the first transmission timing (Yes at S605), the uplink managing unit 305 instructs the encoding/modulating unit 306 to perform UL data transmission at the first transmission timing. The carrier sense unit 302 instructs the IFFT processing unit 332 to transmit the transmission signal at the first transmission timing. As a result, the transmission signal is transmitted to the unlicensed band at the first transmission timing (S606). Then, the uplink managing unit 305 again executes the process illustrated at Step S600.

Meanwhile, when the unlicensed band has been detected idle later than the first transmission timing (No at S605), the uplink managing unit 305 instructs the encoding/modulating unit 306 to perform UL data transmission at the second transmission timing. The second transmission timing is specified at Step S609 explained later. The carrier sense unit 302 instructs the IFFT processing unit 332 to transmit the transmission signal at the second transmission timing. As a result, the transmission signal is transmitted to the unlicensed band at the second transmission timing (S607). Then, the uplink managing unit 305 again executes the process illustrated at Step S600.

When the unlicensed band is busy (No at S604), the uplink managing unit 305 increases the variable k by 1 (S608 in FIG. 14). Then, the uplink managing unit 305 specifies the timing at which the time k-times the offset has passed from the first transmission timing as the second transmission timing (S609). The uplink managing unit 305 then determines whether the time limit indicated by the time limit information acquired from the UL grant has passed (S610). When the time limit has passed (Yes at S610), the uplink managing unit 305 cancels the UL data transmission indicated by the UL grant (S611), and again executes the process at Step S600 illustrated in FIG. 13.

Meanwhile, when the time limit has not passed (No at S610), the uplink managing unit 305 determines whether it reaches the timing before a predetermined time from the second transmission timing specified at Step S609 (S612). When it does not reach the timing before a predetermined time from the second transmission timing (No at S612), the uplink managing unit 305 again executes the process illustrated at Step S610. Meanwhile, when it reaches the timing before a predetermined time from the second transmission timing (Yes at S612), the uplink managing unit 305 again executes the process at Step S604 illustrated in FIG. 13.

Advantageous Effects of Third Embodiment

The third embodiment has been explained above. As is apparent from the explanation, according to the wireless communication system 10 of the present embodiment, when the unlicensed band is not detected idle by the time of the first transmission timing after the reception of the UL grant, the terminal 30 waits from the second transmission timing until a timing before a predetermined time. Then, the terminal 30 again executes the LBT at the timing before the predetermined time from the second transmission timing, and performs UL data transmission at the second transmission timing when the unlicensed band is detected idle. As a result, when the unlicensed band is busy at the first transmission timing, the terminal 30 autonomously performs UL data transmission after the unlicensed band is detected idle even if the UL grant is not retransmitted from the base station 20. This makes it possible to improve the throughput of UL. Moreover, because the retransmission of the UL grant can be reduced, it is possible to reduce the processing load of the base station 20 and suppress an increase in traffic of the licensed band.

Hardware

Figure 15:
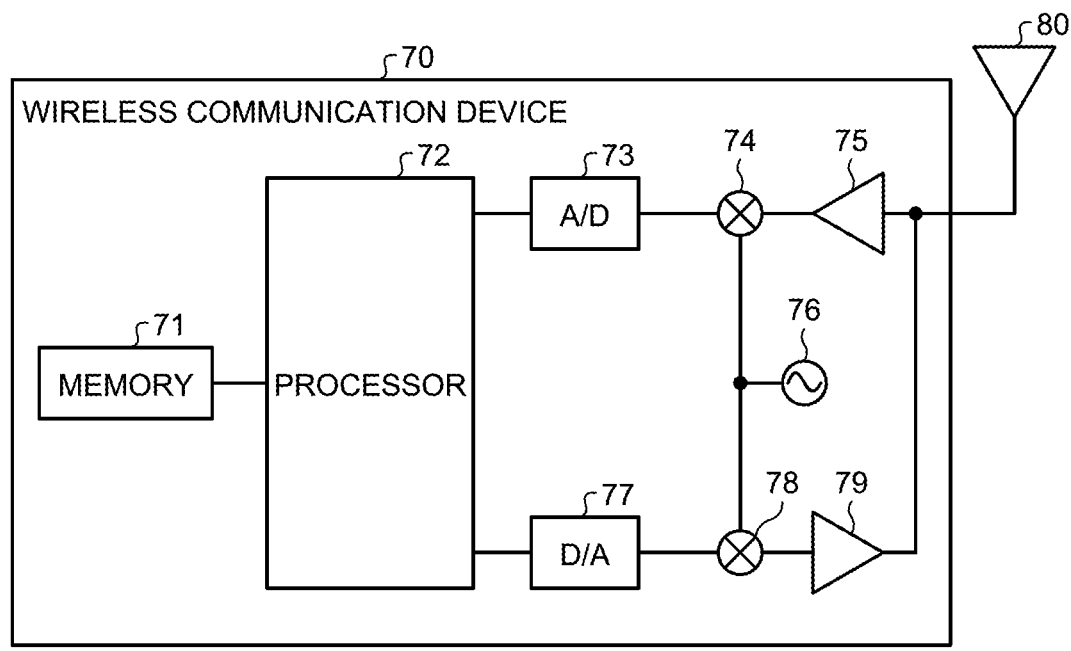
FIG. 15 is a diagram illustrating an example of a wireless communication device that implements a function of the base station or of the terminal.

The base station 20 and the terminal 30 according to the embodiments can be implemented by, for example, a wireless communication device 70 illustrated in FIG. 15. FIG. 15 is a diagram illustrating an example of the wireless communication device 70 that implements the function of the base station 20 or of the terminal 30. The wireless communication device 70 includes, for example, a memory 71, a processor 72, an analog-to-digital converter (A/D) 73, a multiplier 74, an amplifier 75, an oscillator 76, a digital-to-analog converter (D/A) 77, a multiplier 78, an amplifier 79, and an antenna 80. Beside this, the wireless communication device 70 may include an interface for performing wired communication with an external communication device.

The antenna 80 receives a radio signal and outputs the received signal to the amplifier 75. The antenna 80 transmits the signal output from the amplifier 79 to the outside. The amplifier 75 amplifies the signal received by the antenna 80 and outputs the amplified signal to the multiplier 74. The multiplier 74 multiplies the signal output from the amplifier 75 and a clock signal output from the oscillator 76 to convert the frequency of the reception signal from the high frequency band to the baseband. Then, the multiplier 74 outputs the frequency-converted signal to the analog-to-digital converter 73. The analog-to-digital converter 73 converts the analog reception signal output from the multiplier 74 to a digital reception signal, and outputs the converted reception signal to the processor 72.

The processor 72 controls the entire wireless communication device 70. The processor 72 can be implemented by, for example, CPU (Central Processing Unit) or DSP (Digital Signal Processor). The processor 72 performs reception processing of the signal output from the analog-to-digital converter 73. In addition, the processor 72 generates a transmission signal and outputs the generated transmission signal to the digital-to-analog converter 77.

The memory 71 includes, for example, a main memory and an auxiliary memory. The main memory is, for example, RAM (Random Access Memory). The main memory is used as a work area of the processor 72. The auxiliary memory is a nonvolatile memory such as a magnetic disk and a flash memory. The auxiliary memory stores various types of programs that operate the processor 72. The program stored in the auxiliary memory is loaded to the main memory and executed by the processor 72.

The digital-to-analog converter 77 converts a digital transmission signal output from the processor 72 into an analog transmission signal and outputs the converted transmission signal to the multiplier 78. The multiplier 78 multiplies the transmission signal converted by the digital-to-analog converter 77 by a clock signal output from the oscillator 76, thereby converting the frequency of the transmission signal from the baseband to the high frequency band. The multiplier 78 then outputs the frequency-converted transmission signal to the amplifier 79. The amplifier 79 amplifies the signal output from the multiplier 78 and transmits the amplified transmission signal to the outside via the antenna 80.

The oscillator 76 generates a clock signal (continuous wave alternating signal) of a predetermined frequency. The oscillator 76 then outputs the generated clock signal to the multiplier 74 and the multiplier 78.

When the wireless communication device 70 functions as the base station 20 illustrated in FIG. 4, the antennas 216, 226, 235, and 245 illustrated in FIG. 4 can be implemented by, for example, the antenna 80. The wireless processing units 215, 225, 234, and 244 illustrated in FIG. 4 can be implemented by, for example, the analog-to-digital converter 73, the multiplier 74, the amplifier 75, the oscillator 76, the digital-to-analog converter 77, the multiplier 78, and the amplifier 79. The other components illustrated in FIG. 4 can be implemented by, for example, the processor 72 and the memory 71.

When the wireless communication device 70 functions as the terminal 30 illustrated in FIG. 5 or FIG. 11, the antenna 300 illustrated in FIG. 5 or FIG. 11 can be implemented by, for example, the antenna 80. The wireless processing units 311, 321, 331, and 341 illustrated in FIG. 5 or FIG. 11 can be implemented by, for example, the analog-to-digital converter 73, the multiplier 74, the amplifier 75, the oscillator 76, the digital-to-analog converter 77, the multiplier 78, and the amplifier 79. The other components illustrated in FIG. 5 or FIG. 11 can be implemented by, for example, the processor 72 and the memory 71.

Others

In each of the embodiments, although the base station 20 transmits the UL grant to the terminal 30 in the licensed band, the disclosed technology is not limited thereto. For example, the base station 20 may transmit the UL grant to the terminal 30 in the unlicensed band. However, in the unlicensed band, transmission is preformed after each communication device detects the availability of the band. Therefore, when a data transmission request to the terminal 30 occurs, the base station 20 performs LBT in the unlicensed band, checks the availability of the band, and then transmits the UL grant 40 to the terminal 30. In addition, the base station 20 may transmit the permission signal in the licensed band.

The terminal 30 with poor reception quality of radio waves transmitted from the base station 20 may possibly fail in reception of the UL grant and the permission signal transmitted from the base station 20. For example, when the UL grant including the offset indicating any value other than 0 is transmitted to a terminal 30, the terminal 30 does not perform UL data transmission when failing in reception of the UL grant or the permission signal. The base station 20 waits for data transmission from the terminal 30 until the time limit specified by the time limit information included in the UL grant has passed. Therefore, when there is unreceived data for the UL grant, transmission of the UL grant to other terminal 30 is postponed. As a result, the throughput of UL may be decreased as the entire system.

In order to avoid this, information indicating that retransmission is not performed may be included in the UL grant to be transmitted to the terminal 30 with poor reception quality of radio waves transmitted from the base station 20. As the information indicating that retransmission is not performed, for example, an offset indicating the value of 0 may be used. As a result, it is possible to avoid the decrease in the throughput of UL due to securing of the retransmission period for UL data transmission with a low success rate.

As a method for identifying the terminal 30 with poor reception quality of radio waves transmitted from the base station 20, for example, the uplink managing unit 202 counts the number of times UL data transmission is not performed even if the UL grant and the permission signal are transmitted as the number of failures for each terminal 30. Then, it is conceivable that the uplink managing unit 202 identifies the terminal 30 having the number of failures that is more than a predetermined number of times as the terminal 30 with poor reception quality of radio waves transmitted from the base station 20. Even if the terminal 30 is identified as the terminal 30 with poor reception quality, thereafter, when the number of times the UL data transmission is performed for the transmission of the UL grant and the permission signal is continuously above the predetermined number of times, identification of the terminal as the terminal 30 with poor reception quality may be released.

The components illustrated in the embodiments are functionally divided according to main processing content in order to facilitate understanding of each device. Therefore, the disclosed technology is not limited by a method of dividing the components and their names. Each device illustrated in the embodiments can be configured to be divided into further more components according to the processing content or to be divided so that one component execute more processes. Moreover, each of the processes may be implemented as a process by software or may be implemented by dedicated hardware such as ASIC (Application Specific Integrated Circuit).

According to one aspect of the present invention, it is possible to improve UL throughput in the unlicensed band.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station that performs wireless communication with a terminal using a first frequency band which needs a license to use for wireless communication and a second frequency band which does not need the license to use for the wireless communication, the base station comprising:
   a generator that generates a request signal for requesting data transmission of the terminal in the second frequency band and specifying a first transmission timing of the terminal; and
   a transmitter that transmits the request signal to the terminal, wherein
   the request signal includes information used for specifying a second transmission timing, which is a next transmission timing when the terminal does not perform data transmission at the first transmission timing and is specified by an offset from a reference timing,
   the transmitter transmits a permission signal for permitting transmission in the second frequency band, after transmitting the request signal, and
   the request signal includes information on a time period to wait for the permission signal.

2. The base station according to claim 1, wherein the reference timing is a timing at which the request signal is to be received.

3. The base station according to claim 1, wherein the reference timing corresponds to the first transmission timing.

4. The base station according to claim 1, wherein
   the request signal includes time limit information indicating a time limit allowed to postpone the data transmission of the terminal.

5. The base station according to claim 1, wherein
   the offset is specified in units of subframes.

6. The base station according to claim 1, wherein
   the offset is set to same value as the number of continuous subframes when the continuous subframes are allocated as a data transmission period in the second frequency band.

7. The base station according to claim 1, wherein the first transmission timing and the second transmission timing corresponds to a first subframe and a second subframe, respectively.

8. A terminal that performs wireless communication with a base station using a first frequency band which needs a license to use for wireless communication and a second frequency band which does not need the license to use for the wireless communication, the terminal comprising:
   a receiver that receives a request signal for requesting data transmission of the terminal in the second frequency band and receives a permission signal for permitting transmission in the second frequency band;
   a determining unit that determines whether the second frequency band is idle or busy; and
   a transmitter that performs, when the determining unit determines that the second frequency band is idle at a first transmission timing after the receiver receives the permission signal in a time period after reception of the request signal, data transmission to the base station in the second frequency band, wherein the request signal includes information used for specifying a second transmission timing, which is a next transmission timing when the terminal does not perform data transmission at the first transmission timing and is specified by an offset from a reference timing, the transmitter transmits data to the base station at the second transmission timing, when the determining unit determines that the second frequency band is idle at the second transmission timing specified by the offset, and the request signal includes information on the time period.

9. The terminal according to claim 8, wherein the reference timing is a timing at which the request signal is received by the receiver.

10. The terminal according to claim 8, wherein the reference timing corresponds to the first transmission timing.

11. The terminal according to claim 8, wherein the transmitter transmits the data using the second frequency band, when the receiver receives the permission signal.

12. The terminal according to claim 8, wherein the first transmission timing and the second transmission timing corresponds to a first subframe and a second subframe, respectively.

13. The terminal according to claim 8, wherein the request signal includes time limit information indicating a time limit allowed to postpone the data transmission of the terminal, and when the determining unit determines that the second frequency band is busy at the second transmission timing within a range by the time limit indicated by the time limit information, the transmitter sequentially specifies a timing at which a period of an integer multiple of the offset passes as the second transmission timing.

14. A wireless communication system comprising a base station and a terminal, wherein the base station and the terminal perform wireless communication using a first frequency band which needs a license to use for wireless communication and a second frequency band which does not need the license to use for the wireless communication, wherein the base station includes:

a request signal transmitter that transmits a request signal for requesting data transmission of the terminal in the second frequency band and specifying a first transmission timing of the terminal to the terminal, and the request signal includes information used for specifying a second transmission timing, which is a next transmission timing when the terminal does not perform data transmission at the first transmission timing and is specified by an offset from a reference timing and information on a time period, and the request signal transmitter transmits a permission signal for permitting transmission in the second frequency band, after transmitting the request signal, wherein the terminal includes:

a receiver that receives the request signal and receives the permission signal;

a determining unit that determines whether the second frequency band is idle or busy; and a data transmitter that performs, when the determining unit determines that the second frequency band is idle at the first transmission timing after the receiver receives the permission signal in the time period after reception of the request signal, data transmission to the base station in the second frequency band, wherein the data transmitter transmits data to the base station at the second transmission timing, when the determining unit determines that the second frequency band is idle at the second transmission timing specified by the offset.

15. The wireless communication system according to claim 14, wherein the data transmitter transmits the data using the second frequency band, when the receiver receives the permission signal.

* * * * *